US006840981B2

(12) United States Patent
Fujioka et al.

(10) Patent No.: US 6,840,981 B2
(45) Date of Patent: Jan. 11, 2005

(54) METHOD OF PRODUCING REDUCED IRON AND PRODUCTION FACILITIES THEREFOR

(75) Inventors: Hironori Fujioka, Hiroshima (JP); Hideaki Mizuki, Hiroshima (JP); Koichi Hirata, Hiroshima (JP); Shigeo Itano, Hiroshima (JP); Susumu Kamikawa, Hiroshima (JP); Hisao Teramoto, Hiroshima (JP); Takashi Yamane, Hiroshima (JP); Shigeki Sueda, Hiroshima (JP); Tetsumasa Kawamoto, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/848,280

(22) Filed: May 4, 2001

(65) Prior Publication Data

US 2001/0032527 A1 Oct. 25, 2001

Related U.S. Application Data

(62) Division of application No. 09/386,291, filed on Aug. 31, 1999, now Pat. No. 6,312,501.

(30) Foreign Application Priority Data

| Sep. 25, 1998 | (JP) | 10-272203 |
| Sep. 30, 1998 | (JP) | 10-294514 |
| Oct. 21, 1998 | (JP) | 10-300167 |
| Feb. 19, 1999 | (JP) | 11-042096 |
| Mar. 23, 1999 | (JP) | 11-077752 |

(51) Int. Cl.$^7$ .............................................. C22B 1/16
(52) U.S. Cl. ........................................ 75/751; 75/746
(58) Field of Search .................... 75/433, 746, 772, 75/751

(56) References Cited

U.S. PATENT DOCUMENTS

| 2,986,460 | A | * | 5/1961 | Babcock et al. ............... 75/433 |
| 3,443,931 | A | * | 5/1969 | Beggs et al. ................... 75/433 |
| 3,536,793 | A | | 10/1970 | Speas et al. |
| 3,753,683 | A | | 8/1973 | Vinaty |
| 3,788,841 | A | | 1/1974 | Agarwal et al. |
| 3,831,913 | A | * | 8/1974 | Ando et al. .................... 75/746 |
| 3,836,353 | A | | 9/1974 | Holley |
| 4,597,564 | A | * | 7/1986 | Hanewald et al. .......... 266/274 |
| 4,701,214 | A | | 10/1987 | Kaneko et al. |
| 5,076,838 | A | * | 12/1991 | Reirson ........................ 75/479 |
| 5,601,631 | A | | 2/1997 | Rinker et al. |
| 5,730,775 | A | | 3/1998 | Meissner et al. |

FOREIGN PATENT DOCUMENTS

| CN | 1 153 218 | 7/1997 |
| DE | 1 231 273 | 12/1966 |
| DE | 34 21 878 | 12/1985 |
| EP | 0 275 863 A | 7/1988 |
| GB | 1196184 | 6/1970 |
| GB | 1 314 059 A | 4/1973 |
| JP | 48 007970 B | 3/1973 |
| JP | 49-10109 | 1/1974 |
| JP | 54 153722 A | 12/1979 |
| JP | 61 130428 A | 6/1986 |
| JP | 3-61339 | 3/1991 |
| WO | WO 97/46844 | 12/1997 |

OTHER PUBLICATIONS

K. H. Bauer, et al., Stahl und Eisen, vol. 110, No. 7, pp. 89–96, "Aufarbeitung Von Huttenreststoffen Nach Dem Inmetco–Direktreduktionsverfahren", Jul. 13, 1990, (with partial English translation).

* cited by examiner

Primary Examiner—Scott Kastler
(74) Attorney, Agent, or Firm—Oblon, Spivak, McClelland, Maier & Neustadt, P.C.

(57) ABSTRACT

A method of producing reduced iron pellets including reducing raw material pellets to obtain reduced iron pellets, and rolling the reduced iron pellets at a temperature ranging between 800 and 1200° C. sufficiently such that the reduced iron pellets undergo sintering.

5 Claims, 23 Drawing Sheets

METHOD OF PRODUCING REDUCED IRON AND PRODUCTION FACILITIES THEREFOR

This application is a Division of application Ser. No. 09/386,291, filed on Aug. 31, 1999 now U.S. Pat. No. 6,312,501.

BACKGROUND OF THE INVENTION

1. Field of the Invention

The present invention relates to a method of producing reduced iron and production facilities therefor, and particularly relates to production facilities for annexing a rotary bed-type direct reducing furnace with a sealed-type electro-blast furnace, a pellet production facility including the rotary bed-type direct reducing furnace and a few improved methods of producing pellets containing reducing materials, and a production facility and method for supplying the pellets into a rotary bed-type direct reducing furnace, and further relates to compositions of raw materials and binders for producing pellets.

2. Background Art

Conventionally, reducing iron is obtained by the steps of forming pellets using mixed raw materials of iron ore and a carbonaceous material by means of pellet production facilities, and by reducing the pellets by means of a direct reducing furnace.

The reduced iron pellets are obtained by forming raw material pellets which are a mixture of raw materials such as an oxide particulate of iron ore and a particulate of carbonaceous material like coal and by heating these pellets at high temperature in a rotary bed-type direct reducing furnace. The thus produced reduced iron pellets are then placed into a melting furnace for meting the reduced pellets and for producing pig iron. Conventionally, a sealed type blast furnace, a so-called submerged arc-furnace is used as the melting furnace, and will be described later.

Production of reduced iron by the rotary bed-type furnace is advantageous in many respects such as (1) it is possible to utilize coal with a reduced cost as the reducing agent, (2) it is possible to acquire a favorable heat economy, since preheating of the raw material pellets prepared by raw materials is not necessary, (3) the reduction reaction can be completed within a short time (approximately 10 min.), because the materials to be reacted (the iron ore powder and the carbonaceous material powder) are in close contact with each other. Therefore, it is possible to construct the rotary bed-type direct reducing furnace in a simple structure and at a reduced cost.

Hereinafter, a conventional rotary bed-type direct reducing furnace will be explained in detail with reference to FIGS. 15 and 16.

FIG. 15 is a perspective view of the conventional rotary bed-type direct reducing furnace (hereinafter, referred to as a reducing furnace). The reference numeral 101 is the reducing furnace, 122 is a burner provided through the side wall of the reducing furnace, 113 is a transporting device for charging the pellets into the reducing furnace, 102 is a conveyer such as a reciprocating conveyer for charging the pellets in a uniformly layer on the rotary bed, 124 is a pellet discharging device such as a screw-type discharging device for discharging reduced pellets (reduced iron pellets) from the reducing furnace, 104 is a container for temporary storing the reduced iron pellets, and 105 is an exhaust gas duct for discharging the combustion gas in the reducing furnace.

The raw material pellets produced by mixing the iron ore powder as the oxide material and a coal powder as the carbonaceous material is supplied to the reciprocating conveyer 102 through the transporting device 113. The raw material pellets are charged into the reducing furnace 101 uniformly as one or two layers on the rotary bed 127. This pellet filled layer is heated by the burner 122 at about 1200° C. and reduced during turning one round in the direction shown by an arrow (clockwise revolution in FIG. 15) in the reducing furnace 101, and the reduced pellets are discharged by the screw type discharging device 124 from the reducing furnace 101, and stored in the container 4. The combustion gas in the reducing furnace 101, after heating the raw material pellets, is discharged through the exhaust dust 105 to the outside the reducing furnace 101, and released into the atmosphere.

FIG. 16 is a cross-sectional developed diagram along the center of the reducing furnace clockwise showing the pellet charging portion and the reduced pellet discharging portion. In FIG. 16, the reference numeral 103 denotes a reduced iron pellets discharging chamber (discharging portion) for discharging the reduced iron pellet layer 128. The rotary bed 127 of the reducing furnace 101 is made of a refractory, its bottom is constructed by a steel member, and wheels are annexed under the steel member. The reference numeral 131 is a rail for these wheels. The rotary bed 127 of the rotary bed-type reducing furnace 101 rotates such that it moves from left to right in a cross-sectional and developed diagram along the center axis of the reducing furnace The burner 122 is used for heating the raw material pellets and air for combustion is supplied to the burner through an air line 123. The reference numeral 134 is a combustion flame, and 125 is a cooling device for cooling the pellet layer indirectly in order to prevent the reduced iron pellet layer from burning. The reference numeral 126 is a damper for sealing the gas flow between the reduced iron pellet discharge chamber and the raw material pellet charging chamber 102.

As hereinabove described, a conventional facility for producing the reduced iron pellets having high mechanical strength is described in detail. Although the reduced iron pellets are produced by the above-described rotary bed-type direct reducing furnace, the other systems may be used for producing reduced iron which comprises a few annexed equipment.

FIG. 17 illustrates a facility containing a perspective view of the rotary bed-type direct reducing furnace 201, wherein the raw material pellets are supplied onto the rotary bed 206 by a charging conveyer 202 through a charging conveyer 204. The inside chamber of the rotary bed-type direct reducing furnace 210 is heated by use of a plurality of burners (not shown).

As shown in FIG. 17, a reduced iron pellet production facility comprises a conventional rotary bed-type direct reducing furnace 201, shown as a cross sectional developed diagram, for producing the reduced iron pellets by heating the raw material pellets P1 at high temperatures, and a rotary cylinder-type cooler 202 for cooling the reduced iron pellets P2 preserved at high temperature after receiving them at a transfer portion 208 during rolling.

The reference numeral 203 denotes a pelletizer for producing pellets of the mixture of the raw materials comprising an iron ore powder and a coal powder. The reference numeral 204 denotes a transporting device such as a belt conveyer, 205 denotes a pellet charging device for charging pellets on the bed 206 into a uniform pellet layer 207.

The reference numeral 208 denotes a discharging device for discharging the heated reduced iron pellets P2 into the rotary cylinder-type cooler 202, and 209 denotes an exhaust gas duct for discharging the combustion gas.

The reference numeral 210 shown in FIG. 4 denotes a cylindrical chute for delivering the reduced iron pellets P2 heated at a temperature of 1100° C. into the rotary cylinder-type cooler 202 and 211 denotes a gas sealing hood.

The reference numeral 212 denotes spray nozzles for spraying cooling water on the outside surface of the rotary cylinder-type cooler 202, and 213 denotes a spray nozzle for spraying cooling water directly on the reduced iron pellets located near the exit port of the cooling cylinder 102. The reference numerals 214 and 215 denote rubber-rollers for supporting the rotating rotary-cylinder-type cooler 202, and 216 denotes a gear for driving the rotary cylinder-type cooler. The numeral 217 denotes a hood as well as a hopper, 218 denotes a sieving screen, and 219 denotes an exhaust duct of water vapor.

Conventionally, although the same rotary base-type reducing furnace as shown in FIG. 15 is used, another method for producing reduced iron pellets is known, in which, wet raw material pellets formed by adding water, mixing, and pelletizing are heated and reduced, without prior drying, in the rotary bed-type reducing furnace shown in FIG. 18 which is the same as that shown in FIG. 15.

A facility for producing the reduced iron pellets by use of wet raw material pellets is shown in FIG. 19, including the rotary bed-type reducing furnace 301.

Referring to FIG. 19, the reference numeral 306 denotes a storage tank for the iron oxide powder such as the iron ore powder, 307 a storage tank for the carbonaceous powder such as a coal powder, and 308 a storage tank for a binder material such as bentonite. A kneading machine 309 kneads materials weighed and collected from these storage tanks 206, 207, and 208, while adding water, and a pelletizing machine 310 produces wet pellets by adding water to the kneaded powders as the material for production of reduced iron pellets. On the other hand, the reference numeral 301 denotes the rotary base-type reducing furnace which is the same as that shown in FIG. 16. The wet raw material pellets are charged continuously on the rotary bed 320 by a pellet charging machine 302 such as a conveyer through a transporting device 311 so as to form a uniform wet pellet layer 312.

As the rotary bed rotates (the rotational direction is shown by an arrow A), wet raw material pellets 312 on the rotary bed 320 are heated and reduced. The numeral 303 denotes a discharging portion of the reduced iron pellets at high temperature, 304 denotes a container for temporary storing the heated pellets, and 305 a exhaust gas duct for discharging the combustion gas in the reducing furnace 201.

In order to improve the mechanical strength in terms of the falling distance of the raw material pellets without being fractured, the type and added amounts were studied. When the raw material pellets are formed as described above, generally, the iron ore powder which mainly contains $Fe_2O_3$ and $Fe_2O_4$ and the carbonaceous material powder such as coal or coke powders are mixed and pelletized into pellets by addition of a binder. As the binder for forming pellets, usually bentonite is incorporated in a range of 0.5 to 1 wt %.

The raw material pellets containing the reducing material, after being pelletized by the pelletizing machine and dried by a drying machine, is charged into the reduced iron producing machine, which is the same rotary base-type direct reducing furnace as that shown in FIG. 15 or 16. Accordingly, the raw material pellets undergo various mechanical impact during transportation or charging on the rotary bed.

FIG. 21 is a diagram for explaining the process using the rotary bed-type reducing furnace. The reference numeral 401 denote a reducing furnace, which has the same structure as shown in FIG. 15. The cross-sectional view of the reducing furnace 401 is shown in FIG. 21. The rotary bed 412 is a disc formed from a belt-like plate, and wheels 413 are provided beneath the rotary bed so as to engage with the rail 414 constructed concentrically about the center axis of the rotary bed. The rotary bed 412 is driven by a driving mechanism (not shown) and rotates on the rail at a certain rotating speed.

As shown in FIG. 21, fine powders of the iron ore and the coal are mixed with the binder, pelletized into pellets (10 to 12 mm in diameter) by a pelletizing machine 402, and dried by a drying machine 403. After being dried, the raw material mixed pellets are charged on the rotary bed of the reducing furnace 401 by a charging machine 404 which will be described later. The pellets moves together with the movement of the rotary bed.

As shown in FIG. 23, a plurality of burners 407 are provided along the outside periphery of the reducing furnace, and a high temperature combustion gas is generated by combustion of a fuel. The high temperature combustion gas circulates in the furnace in the direction opposite to that of the rotational direction (shown by an arrow A) of the furnace, and the inside of the reducing furnace is maintained at high temperature. This high temperature atmosphere reduces $Fe_2O_3$ and $Fe_3O_4$ in the iron ore and the combustion gas is then discharged to a preheater 409 of primary air for combustion and released to the air after passing through a dust collector 410.

The raw material pellets are directly reduced during one circulation in the rotary bed reducing furnace and the thus reduced pellets containing reduced iron are discharged from the reducing furnace by means of a screw-type discharging machine 405 (FIG. 24) located near the pellet charging portion and the reduced pellets are supplied to the subsequent process after being cooled by a cooler 406.

A pellet charging machine 404 is provided for charging the raw material pellets on the rotary bed as a layer of pellets having a uniform thickness (the thickness of one or two pellets layer).

Here, the raw material pellets charging machine for charging the raw material on the rotary bed of the rotary bed-type direct reducing furnace will be described.

FIGS. 24 and 25 show the pellet charging machine, which comprises a receiving portion 516 of the raw material pellets, an inclined plate 516b for guiding the pellets discharged from the receiving bin 516, and a pair of partition plates 517 and 518 for controlling the thickness of the pellet laminate layer. The height of the opening H3 at the bottom of the receiving portion 516, the intervals H2 and H1 under the partition plates are set as H3>H2>H1. The pellets in the receiving bin 516 is supplied onto the rotary bed 512 after passing through intervals of H3, H2, and H1 which becomes sequentially smaller.

A first problem arises in the conventional rotary bed-type direct reducing furnace 1 as shown, for example, in FIGS. 15 and 16 in that the inner pressure of the raw material pellet charging portion 150 is made negative by an exhaust fan for discharging the combustion gas, because the pellet charging portion 150 is close to the exhaust duct 105 and is opened to the outside atmosphere. In addition, a space is formed in between the pellet charging portion 150 and the charging conveyer 102, and it is likely to cause air flows in the directions 153 and 154.

Even though a damper 126 is formed to prevent air from flowing between the pellet charging portion 102 and the reduced iron pellet discharging portion 103, the leak air is flown into the pellet discharging portion as shown by an arrow 155 due to insufficient seal. Thereby, the first problem encountered is that the reduced iron pellets at high temperature are again oxidized according to the following chemical reactions caused by the leak air flown into the reducing furnace 101.

Fe (reduced iron)+½$O_2$→FeO (1)

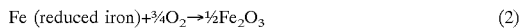

Fe (reduced iron)+¾$O_2$→½$Fe_2O_3$ (2)

Sometimes, the combustion gas is made to flow into the pellet discharging portion 103, because the internal pressure balance in the pellet charging portion 150 and the pellet discharging portion 103 is destroyed due to the air flow 55. Since the combustion gas is an oxidizing gas containing $CO_2$ gas and $H_2O$ gas, the reduced iron is re-oxidized by the following chemical reactions.

Fe+$CO_2$→FeO+CO (3)

Fe+$H_2O$→FeO+$H_2$ (4)

The second problem concerns the mechanical strength of the reduced iron pellets discharged from the reducing furnace. That is, the reduced iron pellets produced in the rotary bed-type direct reducing furnace have a very low density and a very low crushing strength, corresponding to very low mechanical strength. Practically, the crushing strength of one reduced iron pellet with a diameter of 10 mm is as low as approximately 30 kgf, which is too fragile to be shattered when such pellets are thrown in a blast furnace as the raw material.

The reason for the weak strength is because the gas phase including oxygen, carbon, and a volatile component (when coal is used as the carbonaceous material) is released from the raw material pellets and also because the reduction time in the reducing furnace 1 is too short to sinter the pellets after the gas release.

The third problem concerns the wet raw material pellets. If the wet raw material pellets are charged onto the rotary bed 227 heated more than 700° C. of the rotary bed-type reducing furnace 201, the wet raw material pellets will be fractured by the explosion of steam generated by the rapid heating of the wet raw material pellet. This fracture by the steam explosion is called bursting, and the bursting naturally reduces the yield of the reduced iron product.

In order to avoid such a bursting phenomenon, the surface temperature at the charging portion (Ti) of the rotary bed is reduced below 700° C. as shown in FIG. 20. As shown in FIG. 20, the surface temperature at the discharging portion (To) is as high as 1100° C. In order to establish the temperature gradient between the discharging portion (To) and the charging portion (Ti), it is necessary to have a considerable distance between the charging portion and the discharging portion, which requires the expanded rotary bed and the increased cost of equipment, which constitute the third problem. The point (b) in FIG. 9 represents the point where the wet pellets are dried and the temperature at the point (b) in the furnace is the lowest.

The fourth problem is related to the composition of the raw material pellets, because the conventional raw material pellets additionally containing bentonite are likely to be fractured by mechanical shocks applied to the raw material pellets during transportation. When dried, the downfall strength of the raw material pellets containing bentonite becomes so weak that almost all of the pellets are fractured when they are dropped from a height of 300 mm. If the raw material pellets are fractured or subjected to surface peeling, the diameters of the pellets becomes uneven which causes uneven reduction in the reducing furnace and which also causes uneven quality of the reduced iron. In order to eliminate the fracture of the raw material pellets, the conventional transportation equipment are designed so as to reduce the falling height of pellets when transporting or charging, which results in reducing the degree of freedom in designing the transportation and charging apparatuses. It is an object of the present invention to provide a method of obtaining the raw material pellets having a high downfall strength.

Furthermore, the fifth problem remains which is related to the charging apparatus of the raw material pellets. As shown schematically in FIG. 10, a problem of the conventional charging apparatus arises in that the raw material pellets are easily broken when the thickness of the pellet layer is controlled by means of the partition plates.

That is, since it is necessary for the charging apparatus to charge a comparatively large amount of pellets onto the rotary bed of the rotary bed-type reducing furnace, the raw material pellets are subjected to a large amount of tensile stress, when pellets are damed by the partition plates 317, 318 for reducing the thickness of the pellet layer, until the pellets are supplied onto the rotary base 327. Therefore, when the pellet charging machine is used, the raw material pellets are broken or the surfaces of the pellets are peeled off. The fracture, breakage, or the surface peeling make pellet diameters uneven, which results in uneven reduction of pellets in the rotary base reducing furnace and this in turn results in making it difficult to maintain the quality of the reduced iron pellets.

As shown in FIG. 7, when the thickness of the charged pellet layer is controlled by the partition plates 317, 318, since the rotary base is in a form of circular belt type, the outer peripheral speed of the rotary base differs from that of the inner peripheral speed, which results in changing the density of the resultant reduced iron pellets. That is, when the conventional pellet charging machine is used, the distribution along the radial direction changes, so that the raw material pellets cannot be uniformly distributed on the rotary base of the reducing furnace. Thereby, the quality of the reduced iron can not be preserved due to the uneven diameters of the pellets by the fracture or peeling of the pellets.

SUMMARY OF THE INVENTION

It is therefore objects of the present invention to provide improved apparatuses and methods for solving the above five problems.

The first embodiment of the present invention provides an apparatus for solving the first problem wherein the air flows from outside into the reduced pellet discharging portion and the reduced iron pellets are likely to be re-oxidized. The first aspect of the present invention is characterized in that a reducing gas mainly composed of $CO_2$ gas, reproduced in the sealed-type blast furnace for melting the reduced iron pellets produced in the direct reducing furnace from raw material pellets, is introduced into a pellet discharging portion of the direct reducing furnace.

The apparatus of the first embodiment comprises a rotary bed-type direct reducing furnace for producing the reduced iron pellets from the raw material pellets composed of the iron oxide powder and the carbonaceous material powder and a sealed-type electro-blast furnace for melting the reduced iron pellets, and a reducing gas introducing means.

The reducing gas introducing means comprises a gas holder for collecting the reducing gas reproduced in the sealed-type blast furnace; and a nozzle which is connected with said gas holder through a pipe line, and which is disposed so as to go through the furnace wall in front of the reduced iron pellet discharging portion for introducing the reducing gas into the reduced iron discharging portion of the direct reducing furnace.

The second embodiment of the present invention provides an apparatus and method for solving the second problem wherein the reduced iron pellets produced in the rotary bed-type direct reducing furnace have a very low density and a very low fracture strength. The second embodiment is characterized in that a rolling action is applied to the heated reduced iron pellets in a temperature range of 800 to 1200° C. just after being discharged from the direct reducing furnace in a heat retaining and rolling portion provided in the cooling cylinder before annealing.

According to the first aspect of the second embodiment, since the deformation resistance of the reduced iron pellets in a temperature range of 800 to 1200° C. is very small, the rolling action applied to the reduced iron pellets in the cooling cylinder gives pellets a sintering effect which makes the reduced iron pellets denser.

According to this method, the rolling of the pellets is carried out in the cooling cylinder for more than 3 min. and less than 20 min., in order to execute sintering and densification of the pellets sufficiently.

According to the third aspect of the second embodiment, a production facility for producing the reduced iron pellets comprises a reducing furnace for obtaining the reduced iron pellets by heating and reducing the raw material pellets composed of the iron oxide powder and the carbonaceous material powder, a heat retaining and rolling portion for executing rolling on the heated reduced iron pellets after receiving them from the reducing furnace, while retaining the heat of the pellets and a cooler for cooling these reduced iron pellets after receiving from the heat retaining and rolling portion.

The above facility according to the third aspect, the raw material pellets are heated and reduced in the reducing furnace, and the thus produced reduced iron pellets are exposed to the rolling action in the heat retaining and rolling portion for producing sintered heated pellets, and the sintered reduced iron pellets are collected after being cooled by the cooler.

According to the fourth aspect of the second embodiment, the heat retaining and rolling portion for receiving the heated reduced pellets rotates together with the rotary cylinder-type cooler.

According to the fifth aspect of the second embodiment, the heat retaining and rolling portion is formed by lining a part of the inside of the rotary cylinder-type cooler with an insulating material. The insulating material lining suppresses the heat of the pellets from dissipating from the cooler wall.

The third embodiment of the present invention provides an apparatus and a method of heating and reducing the wet raw material pellets in the reducing furnace.

According to the first aspect of the third embodiment, the method of using the wet raw material pellets comprises the steps of forming a bed covering layer on the rotary bed by use of heat insulating particles having a higher melting point than the heating temperature of the raw material pellets, and subsequently supplying the wet raw material pellets on the bed covering layer. Examples of the heat insulating particles includes particles of lime stone or dolomite or basic oxide particles obtained by mixing these particles.

According to the second aspect of the third embodiment, the rotary bed-type direct reducing furnace, provided with a wet raw material pellet charging device for charging the wet raw material on the rotary bed of the reducing furnace, comprises a bed covering particle supplying device for covering the rotary bed by a bed covering particle layer by use of the heat insulating material particles. The heat insulating material particle supplying device comprises a first hopper for storing the heat insulating material particles and a second hopper which receives the heat insulating particles discharged from the first hopper and which is provided with an opening at the bottom end such that the opening faces toward the rotary bed of the reducing furnace leaving a space therebetween.

The bed covering particle layer formed by spreading the insulating material particles having a high melting point on the rotary bed before charging the wet raw material pellets acts as the insulating layer for the wet raw material pellets. In this case, the surface of the rotary bed is only required to be cooled to a level of 1000° C. until the wet raw material pellets are charged after the reduced pellets are discharged, a shorter distance is necessary between the discharging portion of the reduced pellets and charging portion of the raw material pellets than the distance in the conventional reducing furnace in which the surface temperature of the rotary bed at the charging portion is 700° C.

The wet raw material pellets are mainly composed of the iron oxide powder and the wet raw material pellets are usually heated at a level of 1300° C. for reduction. Thus, the insulating material particles should have a melting point of more than 1300° C. so as not to be melted during heating (temperature in the furnace), and it is preferable for the insulating material particles to have a melting point of more than 1400° C.

In addition, since the basic oxide materials such as lime stone or dolomite have a considerably low thermal conductivity and a comparatively high specific heat, the bed covering layer formed by use of these particles constitutes a quite effective insulating layer for the wet raw material pellets. Furthermore, these insulating material particles are not only stable in the high temperature reducing atmosphere, but also functions as a desulphurization agent in the subsequent melting process of the reduced iron pellets after being discharged into the container together with the reduced iron pellets.

The fourth embodiment of the present invention provides a method and compositions of the raw material pellets composed of the iron oxide powder, the reducing material powder, and binders in order to improve the mechanical strength of the raw material pellets. According to the first aspect, the method of forming the raw material pellets comprises the steps of forming raw material pellets by combining and mixing the iron oxide powder, a reducing material powder, a binder material, and a predetermined amount of adjusting water; wherein the binder material is selected from either or both of carboxymethylcellulose and polyvinylalcohol, and tar.

According to this aspect, the raw pellets are produced by a pelletizing machine and the like, after mixing the iron ore powder, the coal powder, and a binder powder and after adjusting the water content. The raw material pellets are produced by drying the above-described raw pellets. The present embodiment allows the dried raw material pellets to have a dramatically improved mechanical strength such as the falling strength by the use of carboxymethylcellulose, polyvinylalcohol, and tar. Carboxymethylcellulose and polyvinylalcohol may be used alone or as a combination.

The second aspect of the fourth embodiment provides a method of producing the raw material pellets by drying the raw pellets in an atmosphere higher than 150° C. after forming the raw pellets, because it is confirmed that a superior falling strength of the raw material pellets is obtained by drying in an atmosphere higher than 150° C.

The third aspect of the third embodiment provides a method of producing the raw materials pellets comprises incorporating at least 0.2 wt % of either carboxymethylcellulose or polyvinylalcohol, and more than 5 wt % of tar. That is, when one binder among carboxymethylcellulose and a polyvinylalcohol is used, it is preferable to add more than 0.2 wt %; and when the tar is used, it is preferable to add more than 5 wt % of tar, in order to obtain the raw material pellets having a particularly preferable falling strength.

The fourth aspect of the fourth embodiment provides a method of incorporating more than 0.2 wt % of a mixture of carboxymethylcellulose and polyvinylalcohol. The falling strength of the raw material pellets is remarkably improved by addition of more than 0.2 wt % of a mixture of carboxymethylcellulose and polyvinylalcohol, when both chemicals are used in combination.

The fifth aspect of the fourth embodiment provides a method of incorporating, as the binder, 4 wt % of tar and more than 0.1 wt % of either carboxymethylcellulose or polyvinylalcohol, or more than 0.1 wt % of the mixture of carboxymethylcellulose and polyvinylalcohol. The addition of binders of 4 wt % of tar and more than 0.1 wt % of either carboxymethylcellulose or polyvinylalcohol, or more than 0.1 wt % of the mixture of carboxymethylcellulose and polyvinylalcohol is effective in obtaining the superior falling strength of the raw material pellets.

The sixth aspect of the fourth embodiment provides a method of incorporating, as the binder, more than 0.2 wt % of either carboxymethylcellulose or polyvinylalcohol, and bentonite within a range of 0.3 to 0.6 wt %. The addition of binders of more than 0.2 wt % of a mixture of carboxymethylcellulose and polyvinylalcohol, and within a certain range of bentonite is further effective in obtaining the superior falling strength of the raw material pellets.

The fifth embodiment of the present invention provides a charging device for uniformly charging the raw material pellets onto a rotary bed of a rotary bed-type reducing furnace in a uniform one pellet layer or a pellet layer formed by piling two pellets. The raw material pellet charging apparatus according to the first aspect comprising a rotating drum, having a truncated conical side surface rotatable around the central axis, located beyond the rotary bed of the reducing furnace, and a hopper for supplying the raw material pellets on the side surface of the rotating drum; wherein the central axis of the rotating drum is located within a plane including the rotational central axis of the rotary bed, and the rotating drum is disposed inclined such that the upper cross-line in cross-lines between the side surface of the rotating drum and the plane is parallel to the rotary bed, and the vertical angle of the conical rotating drum is set such that the ratio of the rotating speed of the side surface of the rotating drum to the rotating speed of the rotating drum beyond the inner portion of the rotary bed coincides with the ratio of rotating speeds at both outside and inside peripheries of the rotary bed.

According to the first aspect, the rotating drum of the pellet discharging apparatus has a conical side surface and rotates around the central axis of the conical drum which traverse the rotary bed. The raw material pellets are supplied from above on the rotating side surface of the rotating drum. Therefore, the pellet supplying apparatus constitutes a rotary feeder without using the partition plates. The central axis of the rotating drum of the present invention is disposed inclined against the rotary bed such that the upper surface of the rotating drum is parallel to the rotary bed, and the upper surface of the rotating drum receives the raw material pellets. Since the vertical angle of the truncated conical rotating drum is set such that the rotating speed of each position of the rotary bed coincides with the rotating speed of the rotary bed of each position beneath each position of the rotating drum.

Consequently, the amount of raw material pellets supplied on each point of the rotary bed becomes proportional to the rotating speed of each corresponding point of the rotating drum just below each points of the rotating drum. This charging apparatus allows distributing the raw material pellets uniformly on the rotary bed of the reducing furnace, irrespective of the radial variation of the rotating speed on the rotary bed. This apparatus also allows preventing friction or pressing being caused between the pellets and the fracture, damage, or surface peeling of the pellets are avoided.

According to the second aspect, the hopper is provided comprising a supplying port, which opens facing to the rotary bed of the reducing furnace, for supplying the raw material pellets, wherein a distance between the ports and the rotary bed is set such that the pellets supplied from the port forms a layer having a thickness of a pellet on the surface of the rotating drum.

That is, since the pellets are supplied from the discharging port as a one pellet layer on the rotating drum, the pellets discharged on the rotary bed becomes uniform. According to the third aspect, the rotating speed of the rotating drum is set such that the rotating speed at a point on the surface of the rotating drum coincide with a integer times of the rotating directional speed at a point just beneath the point on the rotating drum. Therefore, it becomes possible to control the thickness of the pellet layer supplied on the rotary bed of the reducing furnace. For example, if supplying the pellets at a thickness of one pellet is desired, the rotating speed of the rotating drum at one point is set so as to coincide with that of the rotating directional speed of the rotary bed just beneath that point. If the rotating speed of the rotating drum is set two times larger than the rotating directional speed of the rotary bed, the pellets are charged by a two pellets layer.

BRIEF DESCRIPTION OF THE DRAWINGS

FIGS. 27A and 27B are diagrams showing the conventional pellet charging device, in which FIG. 27A shows the structure and FIG. 27B shows when pellets are charged by the device.

DETAILED DESCRIPTION OF THE INVENTION

Hereinafter, the details of the present invention will be described according to the embodiments of the present invention with reference to the attached drawings.

First Embodiment

Figure 1:
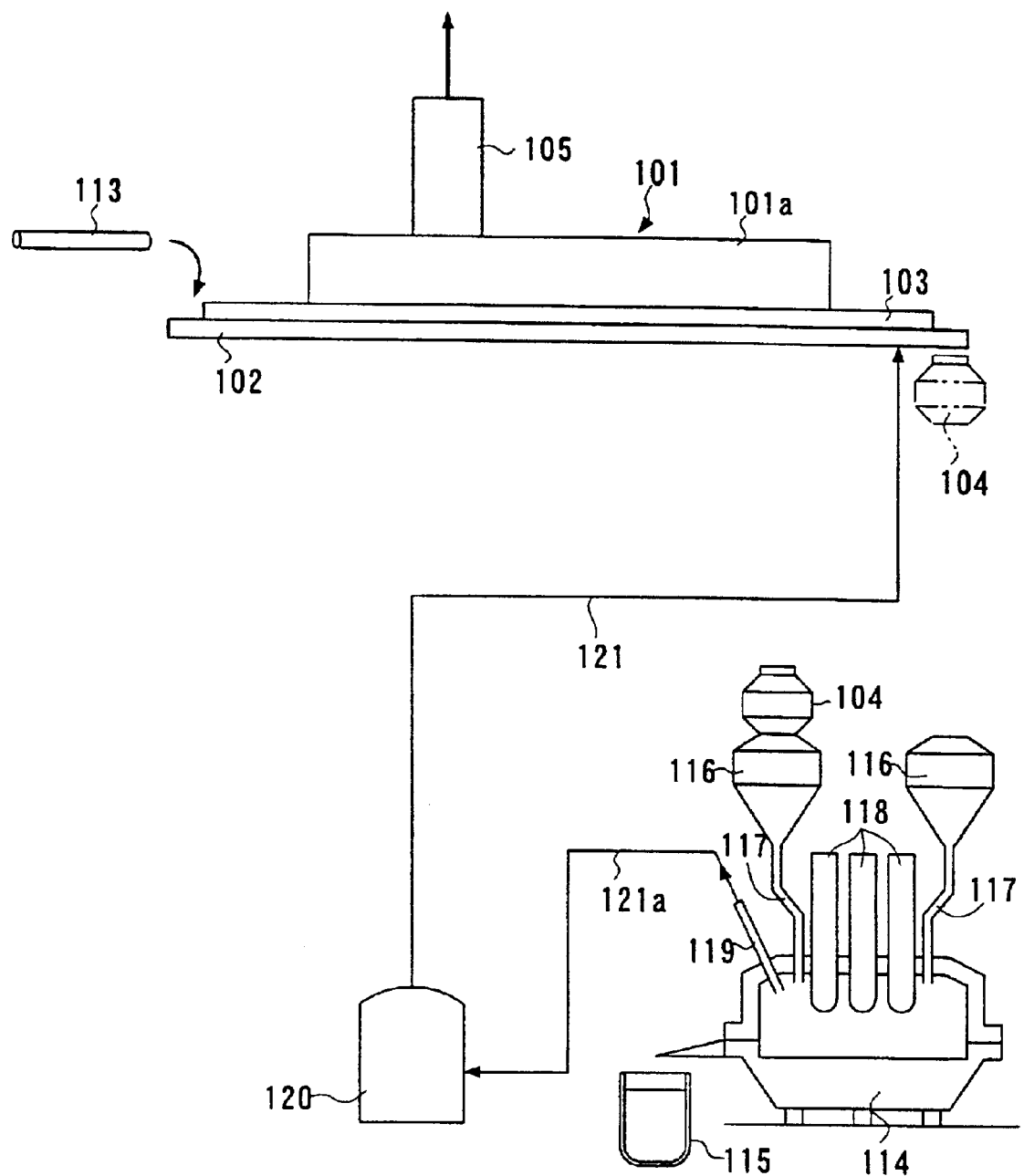
FIG. 1 is a schematic diagram showing the whole facility for producing reduced iron, including a reducing furnace and an electro-blast furnace, wherein a reducing gas generated in the electro-blast furnace is introduced into the reducing furnace.
Figure 21:
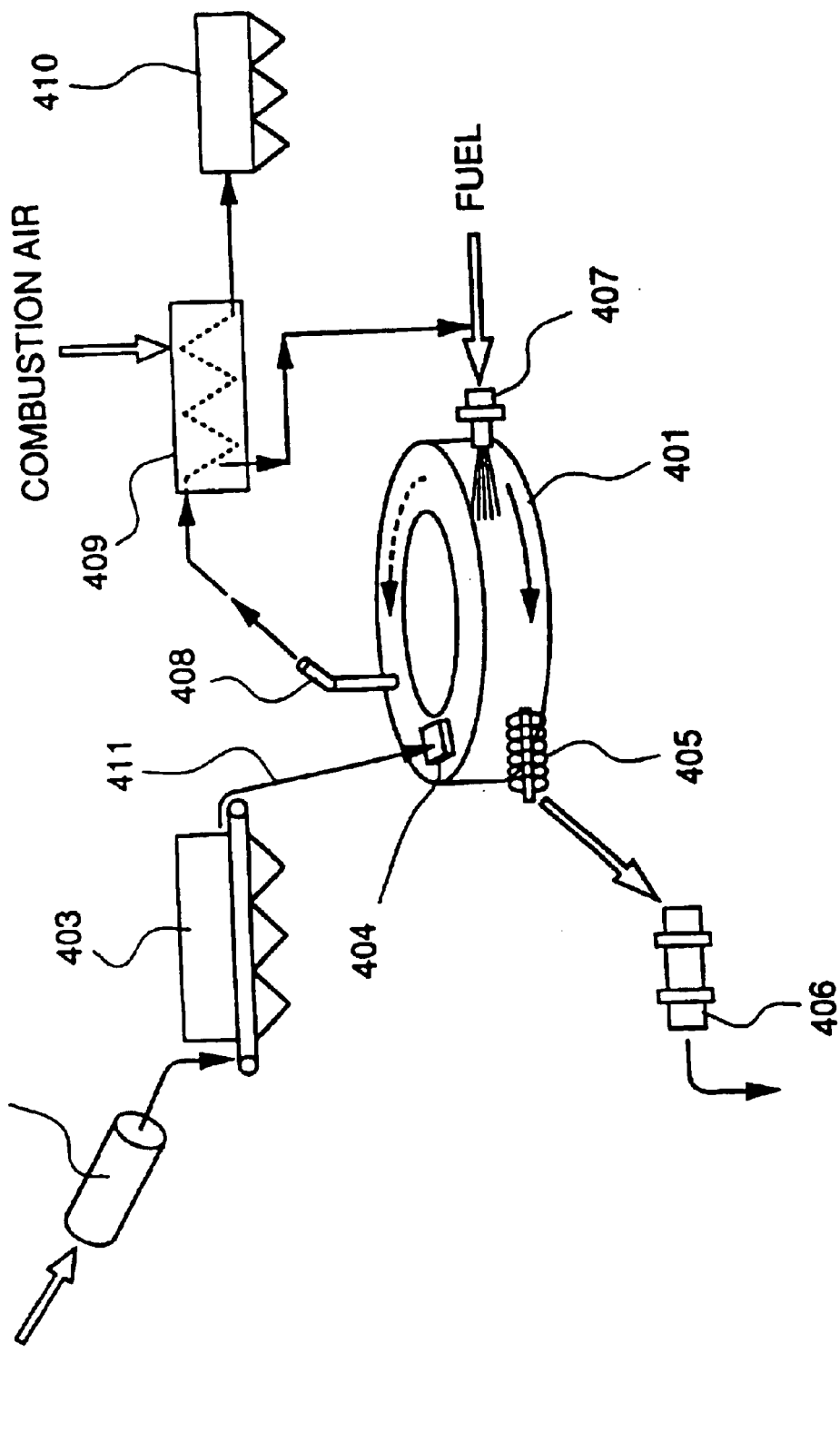
FIG. 21 is a schematic diagram showing a reduced iron pellet producing system including a reducing furnace and accessories.
Figure 22:
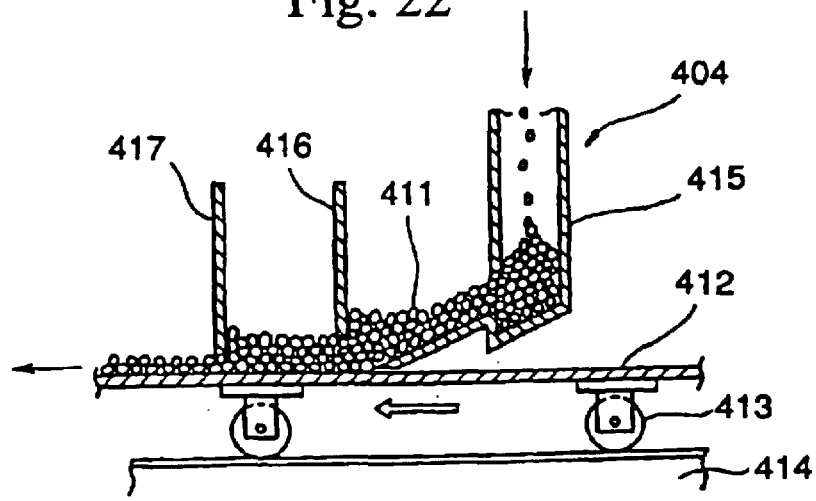
FIG. 22 is a schematic diagram showing locations of devices of a conventional rotary bed-type direct reducing furnace and accessories.
Figure 24:
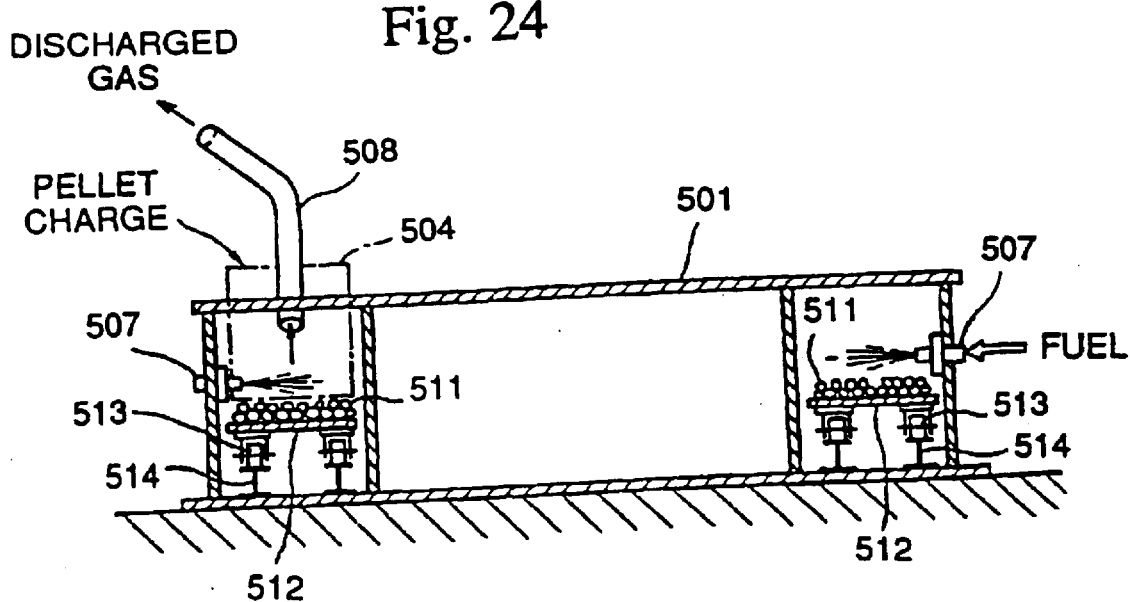
FIG. 24 is a diagram showing a conventional charging apparatus for charging raw material pellets in the rotary bed-type reducing furnace.
Figure 23:
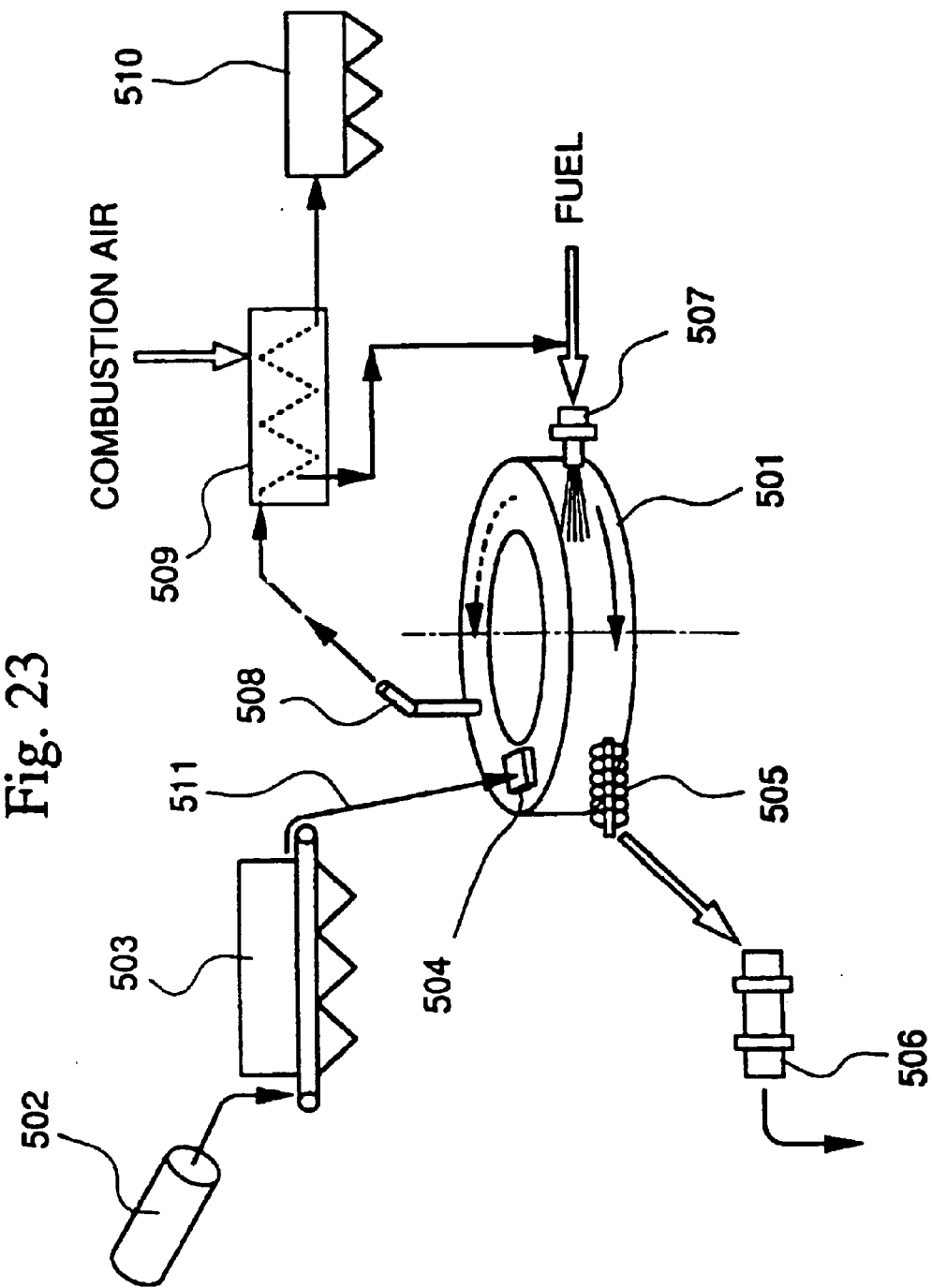
FIG. 23 is a side view of the reduced iron pellet discharging device of the conventional rotary bed-type reducing furnace.
Figure 25:
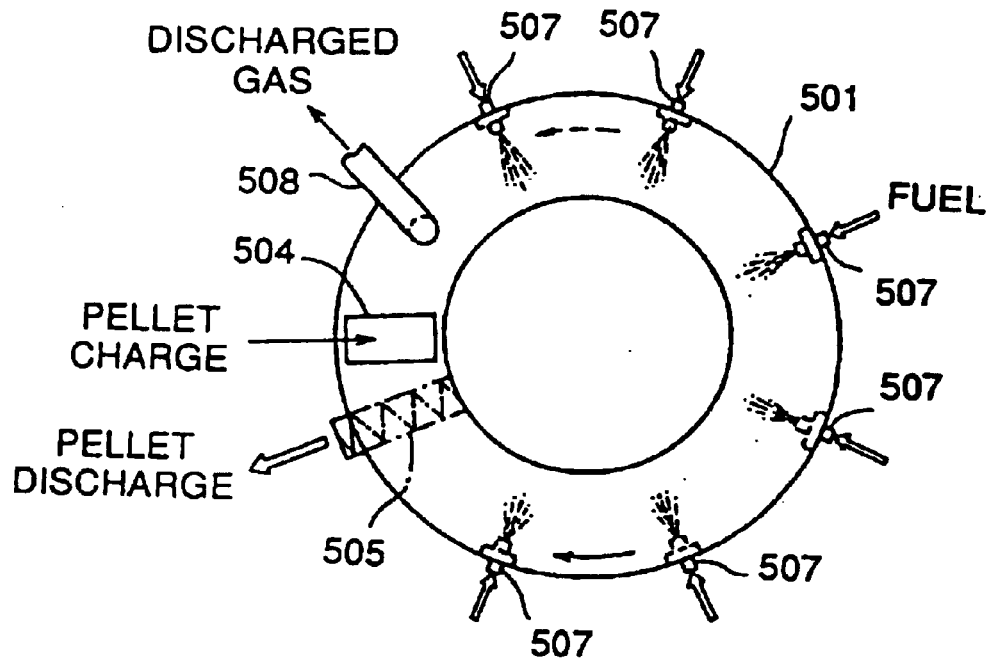
FIG. 25 is a diagram showing the conventional charging apparatus when the raw material pellets are loaded.
Figure 26:
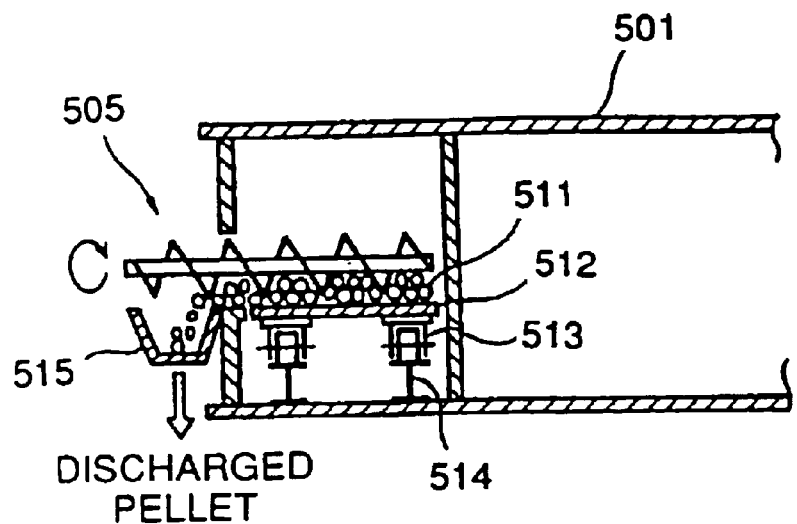
FIG. 26 shows a positional relationship of various accessories in the rotary bed direct reducing furnace.
Figure 27A:
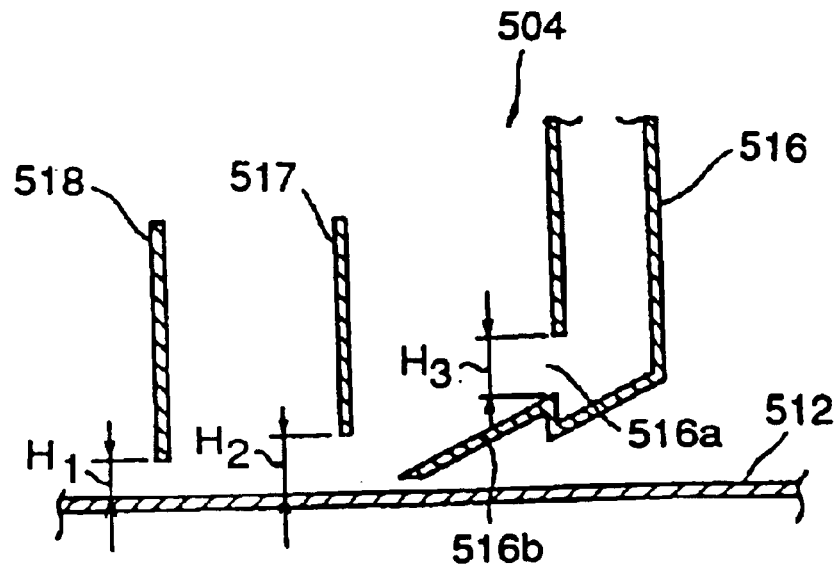
Figure 27B:
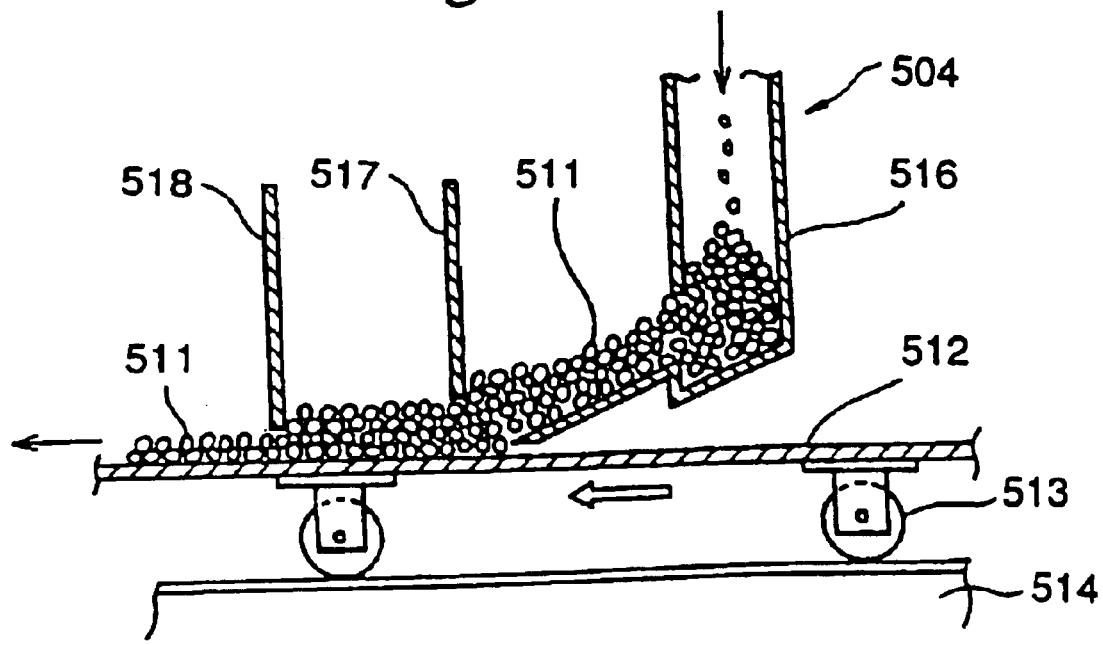

FIG. 1 is a schematic diagram showing the whole facility for producing reduced iron production, and the same rotary bed-type direct reducing furnace shown in FIG. 21 is used in the production facility shown in FIG. 1.

Figure 2:
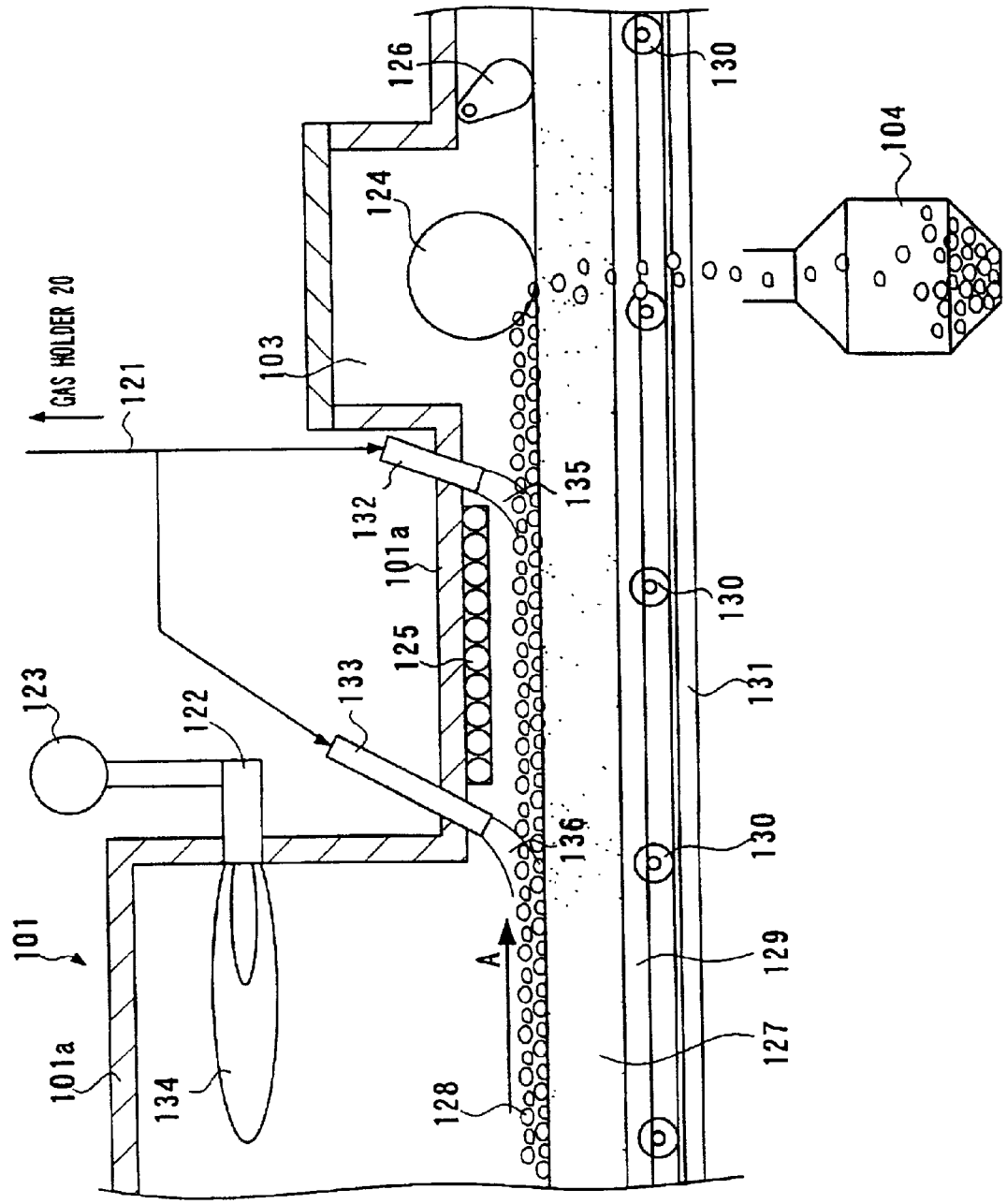
FIG. 2 is a developed diagram showing a part of the rotary bed-type reducing furnace, indicating disposition nozzles for introducing the reducing gas.

Referring to FIG. 2, the reference numeral 1 denotes a rotary bed-type direct reducing furnace and FIG. 1 is obtained by developing the circular furnace shown in FIG. 1. The numeral 2 denotes a charging device (e. g. a reciprocating conveyer) of raw material pellets, 3 a discharging portion for discharging the reduced iron pellets to the outside of the reducing furnace, 4 a container for discharging the reduced iron pellets, 5 a exhaust duct for discharging the exhaust gas in the reducing furnace 1. The rotary bed-type direct reducing furnace 1 is the same as the conventional reducing furnace shown in FIG. 1G and the operation of the reducing furnace is also the same as the conventional reducing furnace.

The reference numeral 14 denotes a sealed type electro-blast furnace (synonym: a submerged arc furnace), in which, when the container 4 storing the reduced iron pellet is transported on the top of the electro-blast furnace 14, the reduced iron pellets are placed into a hopper 16 of the electro-blast furnace 14 without contacting with air and charged into the electro-blast furnace 14 through a chute 17. The reduced iron pellets thus charged into the electro-blast furnace 14 are melted in sequence by applying currents between electrodes 18. The molten pig iron at this stage contains a considerable amount of carbon. This molten pig iron is intermittently discharged into a ladle and it is converted into a molten steel through desulfuration and decarburization treatments.

The reduced iron pellets after the heating and reducing treatments in the rotary bed-type direct reducing furnace still contain remaining unreduced iron oxide (FeO) and CO gas is generated when the unreduced iron oxide is exposed to the strong reducing atmosphere in the sealed-type electro-blast furnace. The amount of CO gas generated in the electro-blast furnace is 30 to 40 $Nm^3$ per a ton of the reduced iron pellets and the CO gas reproduced in the electro-blast furnace is discharged through the exhaust pipe 19 and stored in a gas holder 20 after washing. The CO gas in the gas holder 20 is introduced into the rotary CO gas bed-type direct reducing furnace 1 through the pipe line 21 inserted near the discharging portion of the reducing furnace 1.

The detail of this embodiment is described hereinafter with reference to FIG. 2. FIG. 2 is a developed cross-sectional view of the rotary bed-type direct reducing furnace 1 wherein the top end of the pipe line 21 is branched into two ends, each of which is connected to the gas introducing nozzles 32 and 33. These gas introducing nozzles 32 and 33 are inserted obliquely through the furnace wall of the reducing furnace 1 at both sides of the cooling device 25.

As described above, the gas holder 20 is a collecting means for the reducing gas generated in the electro-blast furnace 14, and the reducing gas introducing means is constructed by the gas holder 20, pipe line 21, and the gas introducing nozzles 32 and 33. It is possible to construct the reducing gas introducing means by connecting lines 21 and 21a directly for introducing the reducing gas into the reducing furnace 1. It is also possible to increase the number of nozzles from one to two or more.

A case of producing about 50 tons per hour of the reducing iron pellet will be described hereinafter as an operational example. The sealed-type elecrtro-blast furnace regenerates about 2200 $Nm^3$ of the reducing exhaust gas mainly composed of CO gas and this reducing exhaust gas is introduced into the reduced iron pellet discharge portion 3 of the reducing furnace 1. Thereby, the reduced iron pellets just before discharge are blown by the reducing gas, and at the same time, the reducing gas effectively reduces the partial pressures of oxidizing gases ($O_2$, $CO_2$, and $H_2O$) in the combustion gas, and thus the re-oxidization of the reduced iron pellets can be suppressed. An analysis of the reduced iron in the container 4 for storing the reduced iron pellets has revealed that the metal ratio of the reduced iron has increased more than 3% in average.

The reducing gas introduced in the reducing furnace can be utilized as a fuel gas; thus the reducing gas contributes to the fuel economy. Practically, the fuel consumption through a series of burners can be reduced by 10%.

Figure 3:
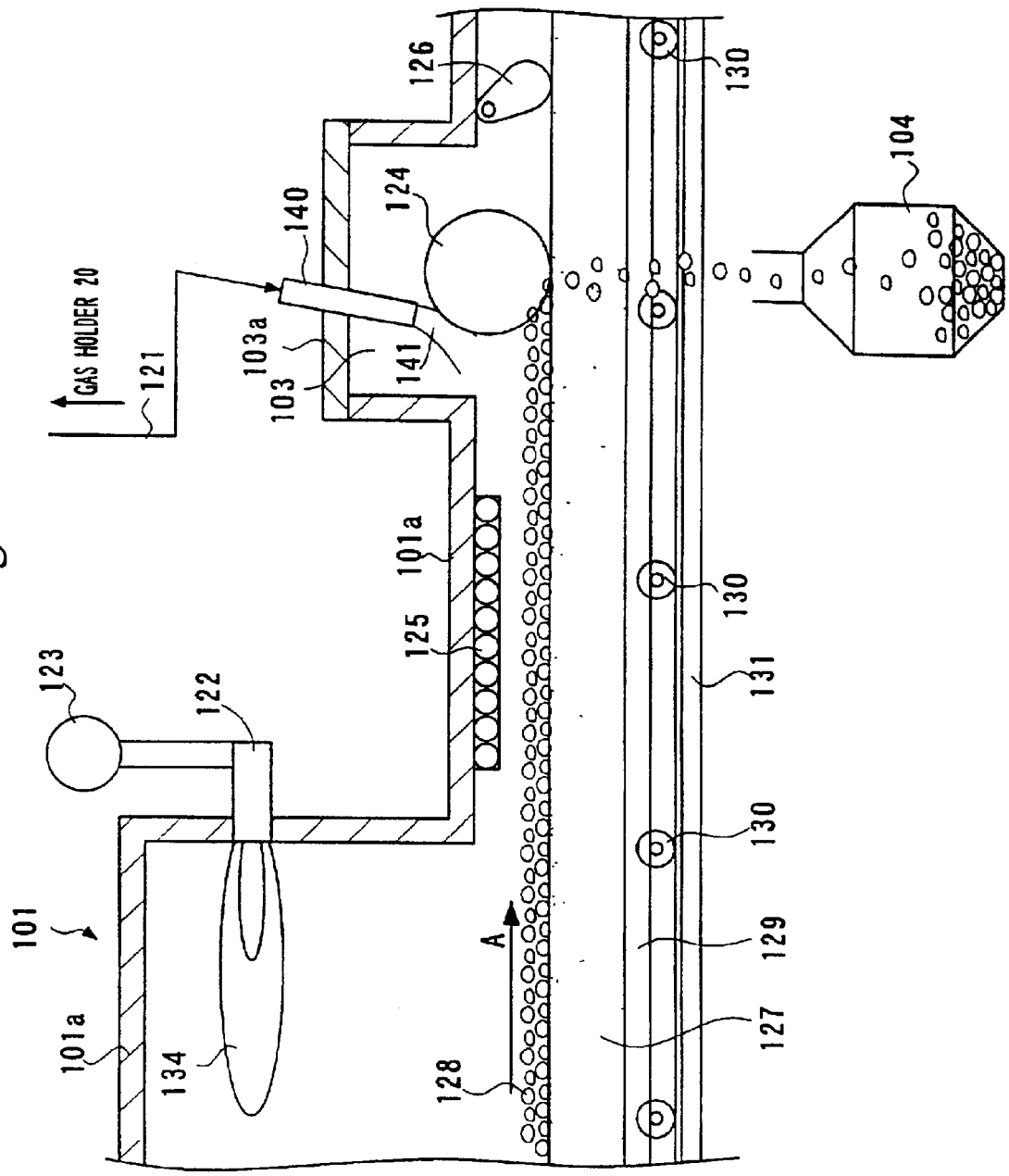
FIG. 3 is a developed diagram showing a part of the rotary bed-type reducing furnace indicating another disposition of nozzles for introducing the reducing gas.

A modified example of the first embodiment is described. As shown in FIG. 3, a reducing gas introducing nozzle 40 is inserted obliquely through the furnace wall (top wall), instead of the two nozzles 32 and 33 in the former example. More practically, the gas nozzle 40 is connected with the gas holder 20 through the pipe line 21.

A screw-type reduced iron pellet discharging machine 24 is provided and the reducing gas is inserted such that the reducing gas flow on the surface of the screw in the direction in conformity with the tangential direction of the rotation of the screw. Accordingly, the screw is effectievely cooled by the reducing gas at almost room temperature. The working life of the reduced iron pellet screw charger can be extended for more than 20%, since the reducing gas flow effectively reduce the corrosion of the screw. In this case, the metal ratio of the reduced iron pellets sampled from the container 4 showed a high ratio of more than 2%. The introduction of the reducing gas reduces the fuel consumption by about 8%.

Figure 4:
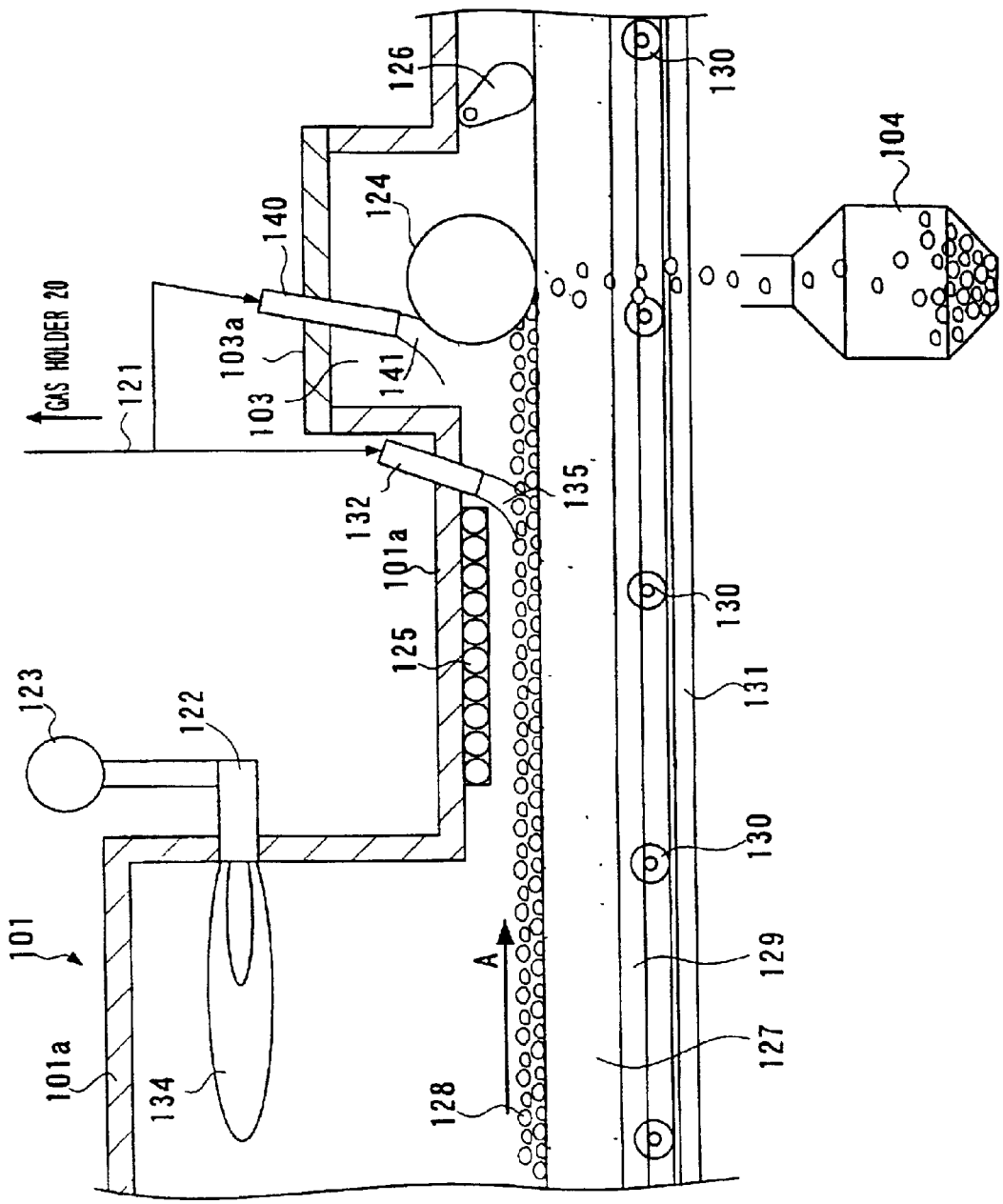
FIG. 4 is a developed diagram showing a part of the rotary bed-type reducing furnace indicating the other disposition of nozzles for introducing the reducing gas.

The other modified example of this first embodiment is shown in FIG. 4. In this example, the pipeline 21 is branched into two lines and each branched line is connected to respective nozzles 33 and 40, instead of the first example of two nozzles 32 and 33. Out of 2200 $Nm^3$/hour of the reduced gas generated in the electro-blast furnace, about 30% is discharged through the nozzle 32 and 70% is discharged through the nozzle 40 and the gas streams 35 and 41 are formed. The working life of the screw discharging machine is extended for more than 15% and the fuel gas consumption is reduced more than 9% over that of the conventional structure.

Second Embodiment

The second embodiment of the present invention provides a method and facility for producing the reduced iron pellets having a high density and a higher mechanical strength.

Figure 5:
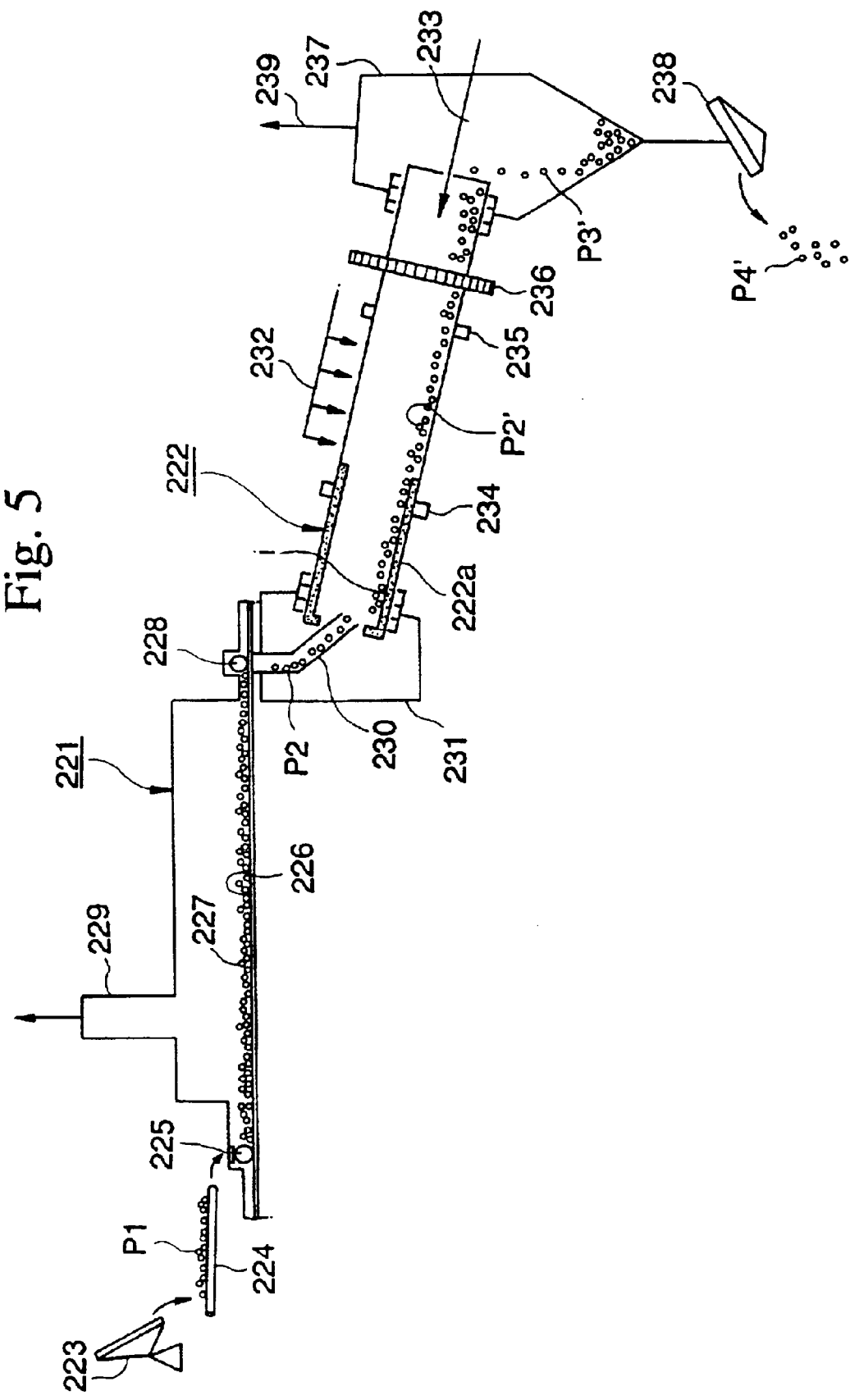
FIG. 5 is a diagram showing the facility for producing reduced iron pellets having a high density and a high mechanical strength.
Figure 6:
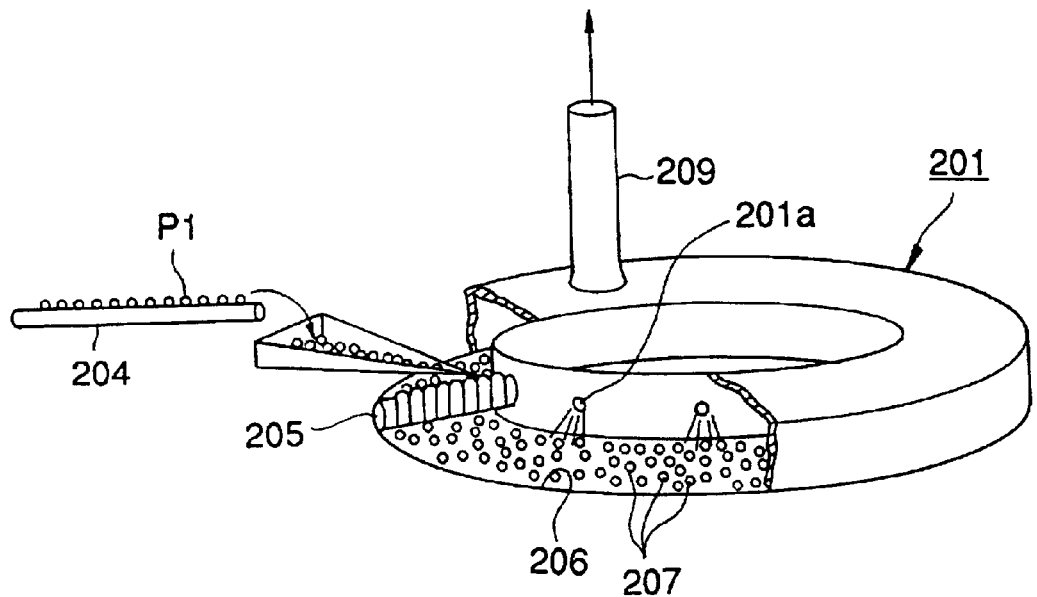
FIG. 6 is a partially opened cross-sectional view of the rotary bed-type direct reducing furnace provided with the raw material pellets forming and charging apparatuses.

FIG. 5 is a diagram showing the facility for producing reduced iron pellets having a high density and a high mechanical strength. This facility comprises a rotary bed-type direct reducing furnace 201 for reducing the raw material pellets into the reduced iron pellets, a heat retaining and rolling portion 272*a* for receiving the reduced iron pellets and executing rolling of the pellets, a rotary cylinder-type cooler 272 for receiving the rolled pellets and cooling the rolled reduced iron pellets, and a container 217. The heat retaining and rolling portion 222*a* is formed by lining a part of the rotary cylinder 222 with an insulating material i. The heat retaining and rolling portion 222*a* occupies about ⅓ of the total length of the rotary cylinder 222.

The reference numeral 233 denotes a pelletizing machine for producing the raw material pellets P1 by pelletizing the mixture of the iron ore powder and the carbonaceous material powder. The numeral 223 denotes a conveying device, 224 a pellet charging machine for charging the raw material pellets on the rotary bed 247 of the reducing machine 201, 228 a pellet layer formed on the rotary bed 227, 244 a reduced iron pellets discharging machine for discharging the high temperature pellets from the reducing furnace 201 to the heat retaining and rolling portion, and 225 a combustion gas exhaust duct for discharging the combustion gas to the outside of the reducing furnace 201.

The reference numeral 230 denotes a chute for supplying the reduced iron pellets into the heat retaining and rolling portion 222*a*, 231 a gas sealing hood for sealing gas, 232 a series of spray nozzles for spraying water on the outer surface of the rotary cylinder, 233 a spray nozzle for spraying water directly on the rolled reduced iron pellets near the exit of the rotary cylinder 222. The numerals 234 and 235 denote tire rolls for rotating the rotary cylinder 222, 236 a gear for driving rotation of the rotary cylinder, and 239 a hood as well as a hopper, 238 a screen, and 239 an exhaust duct for discharging waste gas.

Hereinafter, a method of producing reduced iron will be described.

The raw material pellets P1, formed by pelletizing the mixture of the iron ore powder and the reducing material powder by the pelletizing machine 223, are transported to the pellet charging machine 224 and charged on the rotary bed 227 of the reducing furnace 201 to form the pellet layer 228. The pellet layer is usually a two pellet layer because the pellet layer is usually heated mainly by radiation. The raw material pellets P1 are reduced by being heated at about 1200° C. on the rotary bed 227 of the reducing furnace 201 and converted into the reduced iron pellets P2. The high temperature reduced iron pellets P2 discharged from the reducing furnace 201 are delivered to the heat retaining and rolling portion 222*a*. The temperature of the reduced iron pellets P2 delivered into the heat retaining and rolling portion 222*a* is at about 1100° C. and the reduced iron pellets as discharged have a density of about 2 $g/cm^3$. The reduced iron pellets discharged are subjected to the rolling motion for more than 3 min. to less than 20 min. Since the deformation resistance of the reduced iron pellets are very low under this temperature condition, the high temperature reduced iron pellets P2 undergo the sintering action and the reduced iron pellets are made further denser becoming compacted reduced iron pellets P2'.

The thus compacted reduced iron pellets P2' are transferred and cooled into a temperature of less than 600° C., while the compacted reduced iron pellets are cooled by the cooling water spray and by the heat dissipating into the furnace wall of the rotary cylinder 222. The compacted reduced iron pellets P3' are further cooled directly by the sprayed water from the spray nozzle 233 to 100° C., and finally collected as the compacted reduced iron pellets P4'.

The collapsing strength of the thus obtained compacted reduced iron pellets increases until a value of 100 kgf per a pellet. In the conventional method, the collapsing strength of the reducing iron pellets has been about 30 kgf for a pellet with a diameter of 10 mm, and thus, it is possible to increase the collapsing strength of a reducing pellet more than three times by the use of the new apparatus and new method described above.

Therefore, the high temperature reduced iron pellets discharged from the reducing furnace can be compacted by the sintering effect obtained by rolling at a temperature range of 800° C. to 1200° C. for more than 3 min. and less than 30 min. and it has been proven that the compacted pellets are not fragile and are suitable for use in the electro-blast furnace.

Third Embodiment

Hereinafter, the third embodiment of the present invention will be described which is related to the use of wet raw material pellets. A new facility is provided for the use of wet raw material pellets.

Figure 7:
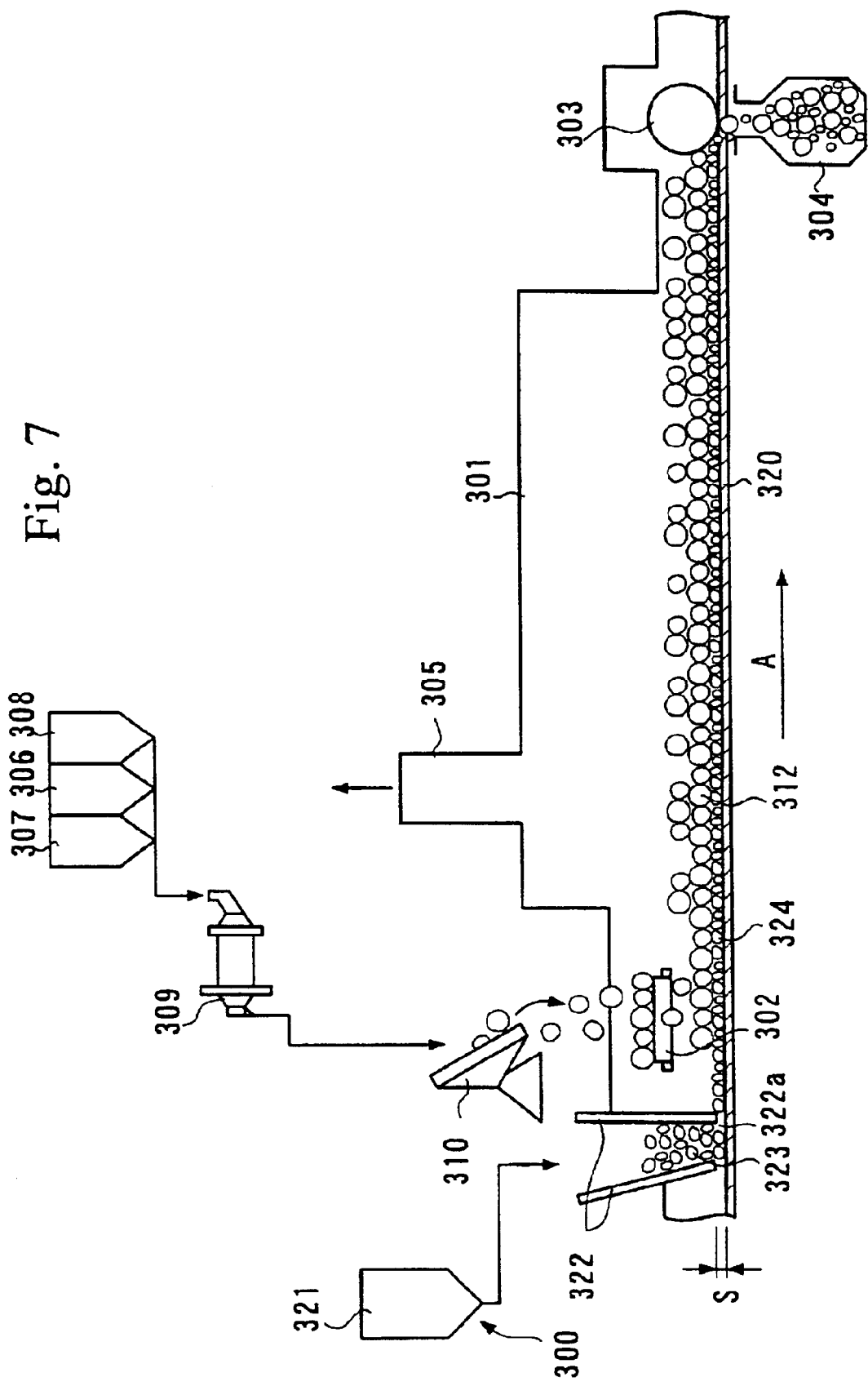
FIG. 7 is a diagram showing the facility for producing reduced iron pellets including the raw material pellet forming facility and the rotary bed-type reducing furnace.
Figure 8:
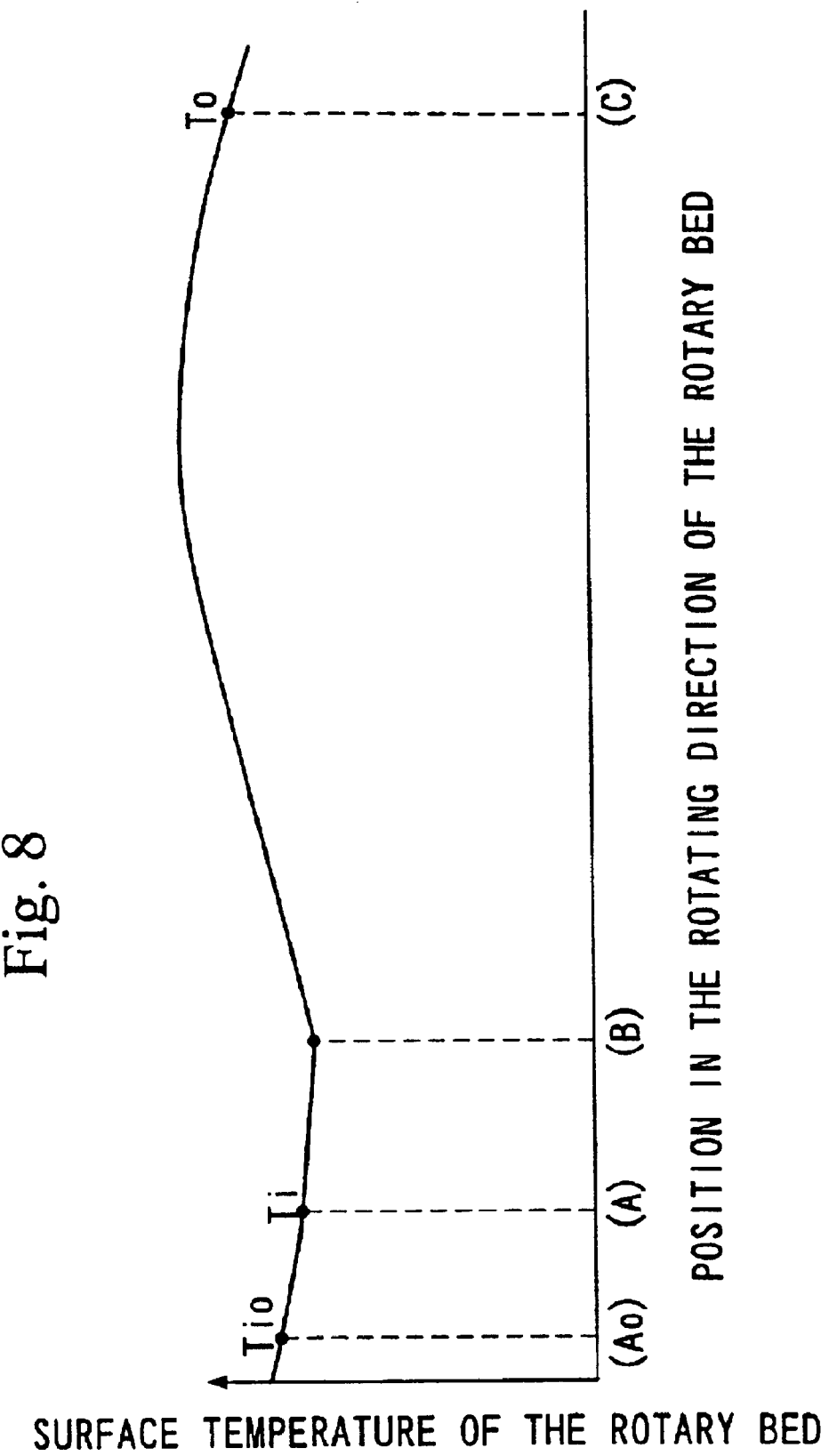
FIG. 8 is a diagram showing the relationship between the surface temperature of the rotary bed and the location on the rotary bed.

The present embodiment will be described with reference to FIGS. 7 and 8. FIG. 7 is a diagram showing the facility for producing reduced iron pellets including the raw material pellet forming facility and the rotary bed-type reducing furnace, and FIG. 8 is a diagram showing the relationship between the surface temperature of the rotary bed and the location on the rotary bed.

As shown in FIG. 7, since reference numerals 306, 307, and 308 denotes hoppers for storing an iron oxide powder, a reducing material powder and a binder, respectively. 309 denotes a mixer and 310 a pelletizer.

Furthermore, referring to FIG. 7, the reference numeral 321 is a hopper for storing the insulating particles 323 such as lime stone particles used for the bed covering layer, 322 a second particle hopper having an opening at the bottom end facing toward the rotary bed 320 of the reducing furnace leaving a specified interval therebetween. These first and second hoppers 321 and 322 constitutes an insulating material supplying device 300 for covering the rotary bed to form a bed covering layer 324 (the heat insulating layer) of the insulating particles 323 having a high melting point, prior to charging the wet raw material pellets. In order to avoid melting, the insulating particles are required to have a higher melting temperature than the heating temperature (1300° C.) of the wet raw material pellets, preferably more than 1400° C. Examples of the high melting point particles include limestone particles, dolomite particles, or basic oxide particles composed of their mixture.

In the rotary bed direct reducing furnace, as shown in FIG. 7, the insulating particles 323 such as limestone particles are supplied through the second particle hopper 322 on the rotary bed 320 uniformly at a point A to form the bed covering layer 324. Since the insulating particles supplying device 300 is constructed by the first hopper 321 and the second hopper 322, the continuous supply of the insulating particles will never be interrupted for a long time even if one of both hoppers is blocked by the particles.

Figure 9:
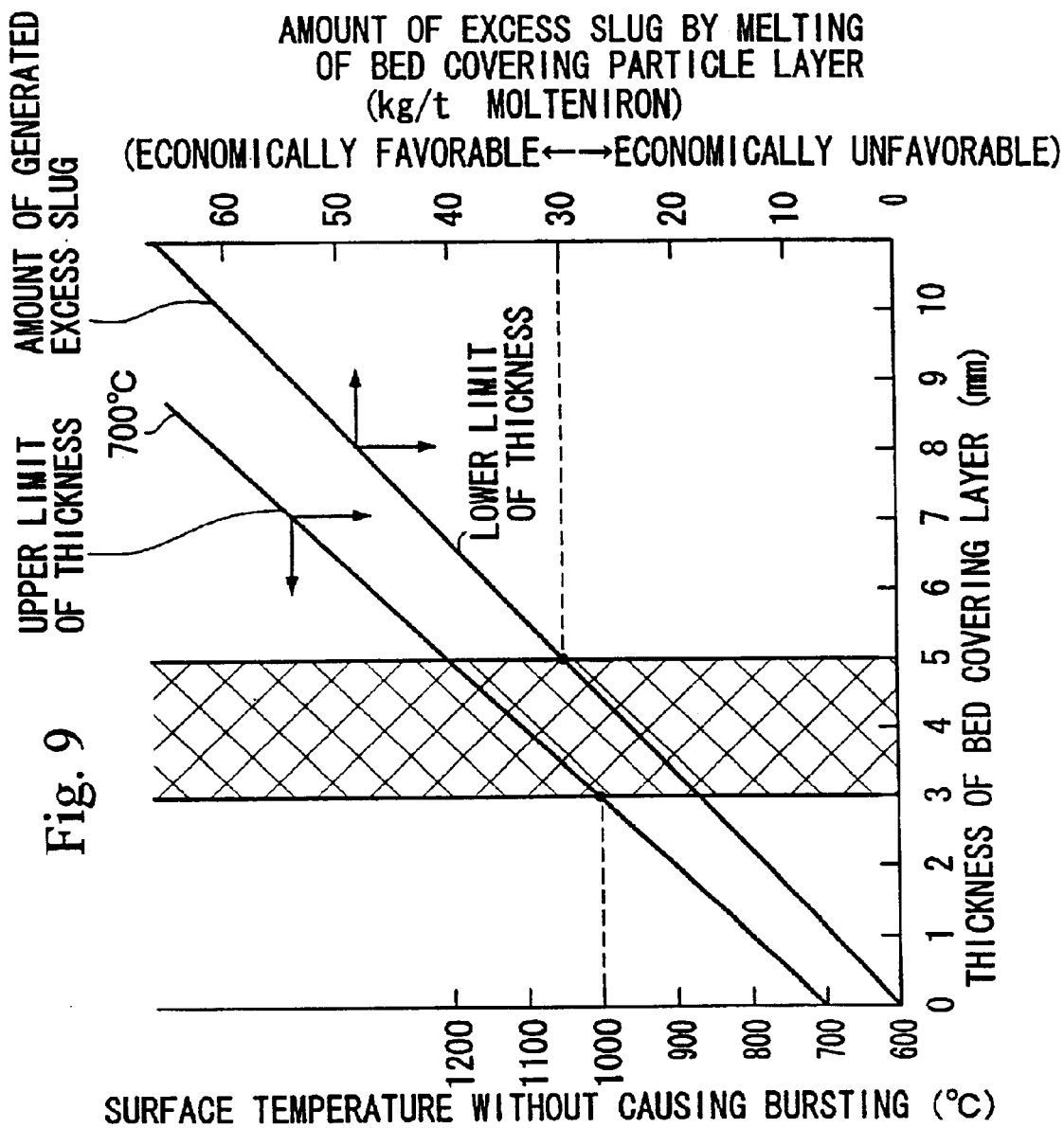
FIG. 9 is a diagram showing a relationship between a thickness of the bed coating layer and the permissible surface temperature of the rotary bed.

As shown in FIG. 9, the appropriate particle size of the insulating particle is preferably in a range of 1 to 5 mm in diameter. In addition, the appropriate layer thickness of the insulating particles is estimated to be in a range of 1 to 5 mm. The wet raw material pellets are charged on the rotary bed just after the insulating particle layer is formed on the rotary bed 320 of the reducing furnace 301, and a layer of the wet raw material pellets are formed. In this case, an appropriate size of the wet raw material pellets is from 7 to 20 mm in general, and single pellet layer or double pellet layer is usually formed.

The wet raw material pellet layer 312 are heated during passing in the reducing furnace, the wet raw material pellets are first dried, the reducing reaction takes place by heating to a high temperature, and the raw material pellets are finally converted into the reduced iron pellets which are discharged by a reduced iron pellets discharging machine 303 at point (C) in FIG. 7 into the container 304. Thereafter, the reduced metal pellets are charged into the electro-blast furnace to be melted and refined into the refined molten metal.

The surface temperature (To) of the rotary bed after discharging of the reduced iron pellets is normally 1100° C. In the conventional reducing furnace, a time consuming operation has been carried out to cool down the surface temperature of the rotary bed below 700° C. However, if the surface of the rotary bed is covered by the insulating particle layer, the wet raw material pellets may be charged without suffering bursting, even if the surface temperature of the rotary bed (Ti) for charging the wet pellets is as high as 1000° C. In addition to the above effect, the advantageous features of the present embodiment include that, even when one hopper of the insulating particles is blocked or becoming empty, it is possible to avoid a discontinuation in the supply of the insulating particles, because two stage hoppers are provided.

Fourth Embodiment

The fourth embodiment, relating to an improvement of the falling strength of the raw material pellets, will be described hereinafter with reference to attached drawings.

Figure 10:
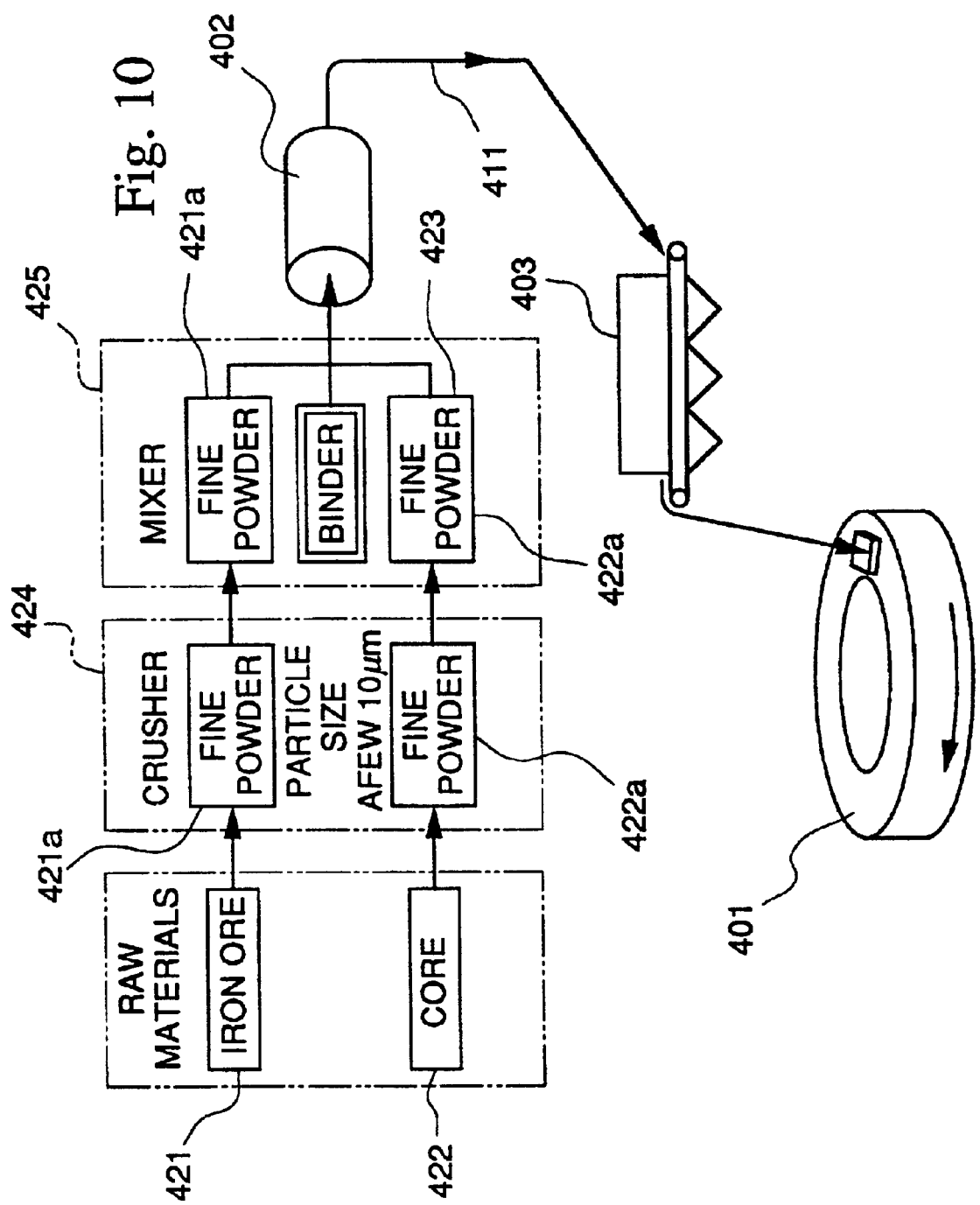
FIG. 10 is a diagram showing a facility for producing reduced iron pellets from wet raw material pellets composed of an iron oxide powder, a reducing material powder, and a binder.

The reduced iron pellets are usually produced by the reducing facility shown in FIG. 10, including a rotary bed-type direct reducing furnace 401.

The iron ore 421 as a raw material of the reduced iron and the coal or coke 422 as the reducing material are weighed to adjust the content of the coal to 2 wt %, and both materials are supplied to each pulverizer 421a and 422a for obtaining powders of each material with the powder size of tens of microns. The pulverized powders of both iron ore and coal are supplied to the pelletizer 402 after these powders are mixed with a viscous binder composed of hydro carbon-type compounds (described in a later section) by a mixer 425.

The powders 421 and 422, and a binder are mixed with a small amount of water (about 10 wt %) by a pelletizing machine 402 and the mixture is pelletized into raw pellets having a diameter in a range of 10 to 20 mm.

This raw pellets are supplied to the drying machine 403. The raw pellets are preserved in an atmosphere maintained at more than 150° C., preferably in a range of 150 to 170° C. Thereby, the raw pellets are dried and the raw material pellets are formed through the dehydration reaction of a part of hydrogen and oxygen.

The raw material pellets after drying are charged on the rotary bed of the reducing furnace, and these pellets are reduced in the reducing furnace by heating in a reducing atmosphere. The combustion gas circulate in the reducing furnace in a direction opposite to that of the rotation of the rotary bed, as shown in the dotted arrow in FIG. 10 and discharged from the exhaust duct 408 to the heat exchange device. The exhaust gas is discharged into the air after preheating the primary air used in the burners 407.

The rotary bed 412 in the reducing furnace 401 rotates in the direction shown by the arrow shown in FIG. 9 once around every ten minutes. The reduced pellets are discharged to the outside of the reducing furnace by a screw-type discharging machine 405 disposed near the charging machine 404 and the reduced iron pellets are cooled into room temperature by a cooling device 406 to be supplied to the next process.

As described above, the raw material pellets undergo various mechanical impacts before they are charged on the rotary bed of the reducing furnace. The conventional raw material pellets formed by use of bentonite do not have sufficient falling strength, so that the freedom of the design is considerably restricted in order to minimize the falling distance of the raw material pellets.

The present embodiment has solved the above problem by the use of particular binders shown below.

In this embodiment, it has been clarified from experimental research that hydrocarbon compounds having a certain viscosity such as carboxymethylcellulose (CMC), polyvinylalcohol (PVA), and tar are preferable as binders in order to improve the falling strength of the raw material pellets.

Table 1 shows the relationship between the content of the binders (content in the raw pellets) and the falling distance of a pellet without fracturing the raw material pellets obtained after drying the raw pellets.

As shown in Table 1, when the tar is used alone as a binder, addition of more than 5 wt % ensures the falling strength (falling distance) of more than 400 mm.

Figure 11:
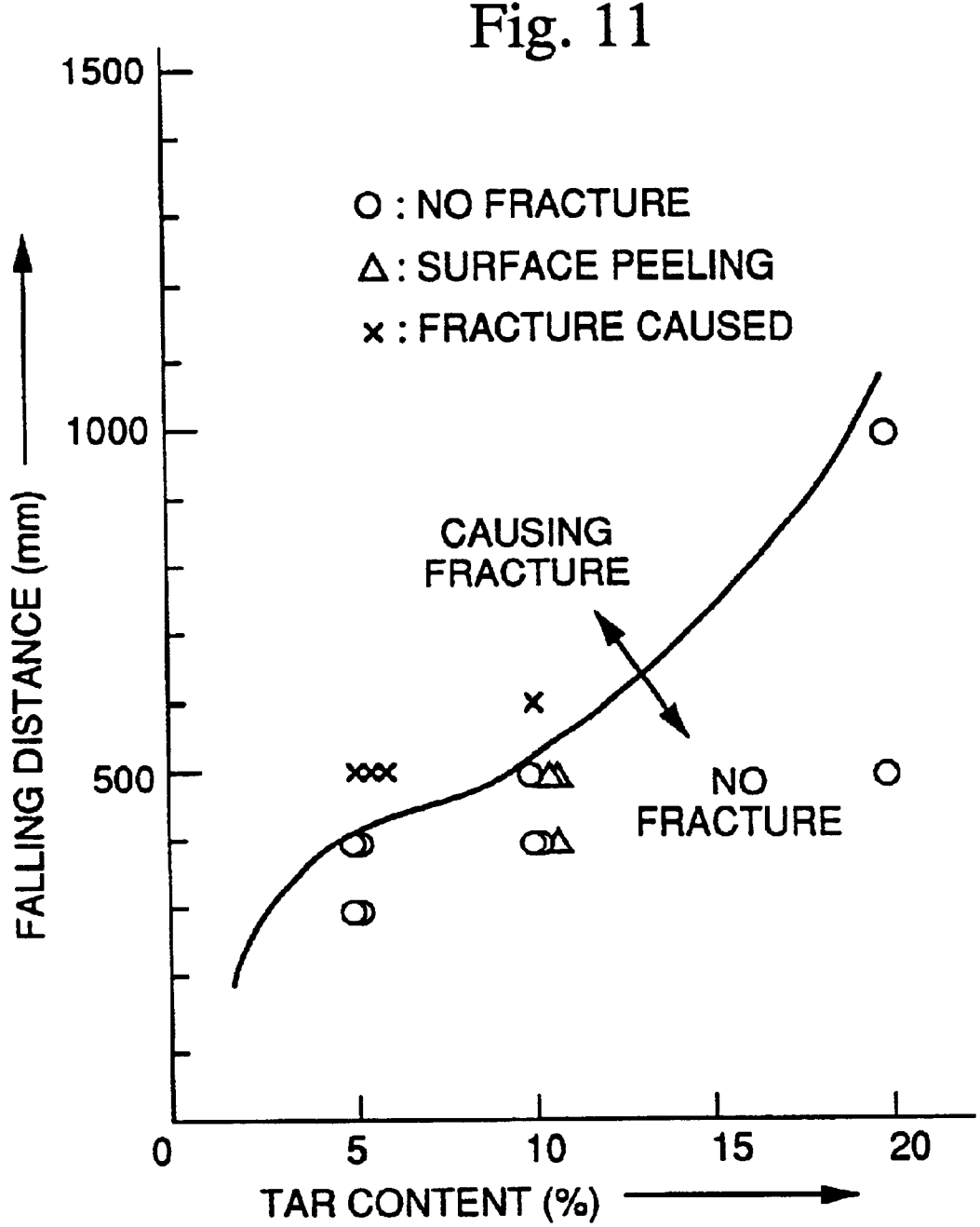
FIG. 11 shows the relationship between the contents of the tar (binder 1) in the raw pellets and the falling distance of the raw material pellets.

FIG. 11 shows the relationship between the contents of the tar (the binder 1) in the raw pellets and the falling strength and the raw material pellets. The falling distance of the raw material pellets can be secured if the content of the tar is more than 5 wt %. As shown in FIG. 11, as the content of the tar increases, the region wherein the raw material pellets are not broken expands and the falling distances of the raw material pellets becomes higher. As shown as examples 2 and 3 in Table 1, when CMC and PVA are used alone, the falling distance of 500 mm can be secured by addition of more than 0.2 wt % of CMC or PVA. As shown for examples 5, 6, 8 and 9 in Table 1, it has been confirmed that the falling strength of the raw material pellets increases as the amounts of CMA and PVA are increased.

When a mixture of CMC and PVA is used, the falling distance of more than 500 mm is secured if the content of the mixture exceeds 0.2 wt %. The falling distance of more than 500 mm is secured if more than 4 wt % of tar and a mixture of more than 0.1 wt % of CMC and PVA are incorporated.

Furthermore, even when the conventional bentonite is used as the binder, addition of more than 0.2 wt % of CMC and PVA makes it possible to secure the galling distance of 500 mm (FIG. 11, examples 12 to 14).

In the repetitive falling experiment, it has been confirmed that the raw material pellets containing more than 5 wt % of tar and more than 0.2 wt % of CMC or PVA show at least two times of the falling distance of 300 mm. The above results are obtained for the raw material pellets after drying, the raw pellets before drying show a falling distance of 400 mm for more than four times, which indicates that the raw pellets of the present embodiment are three times higher than the conventional raw pellets containing only bentonite.

As shown above, the present embodiment showed that it is possible to remarkably improve the strength of the raw material pellets by selecting types and amounts of binders used for producing the raw material pellets.

Fifth Embodiment

The fifth embodiment of the present invention provides an improved pellet charging device which is capable of charging the raw material pellets on the rotary bed of the rotary bed-type direct reducing furnace.

Figure 14:
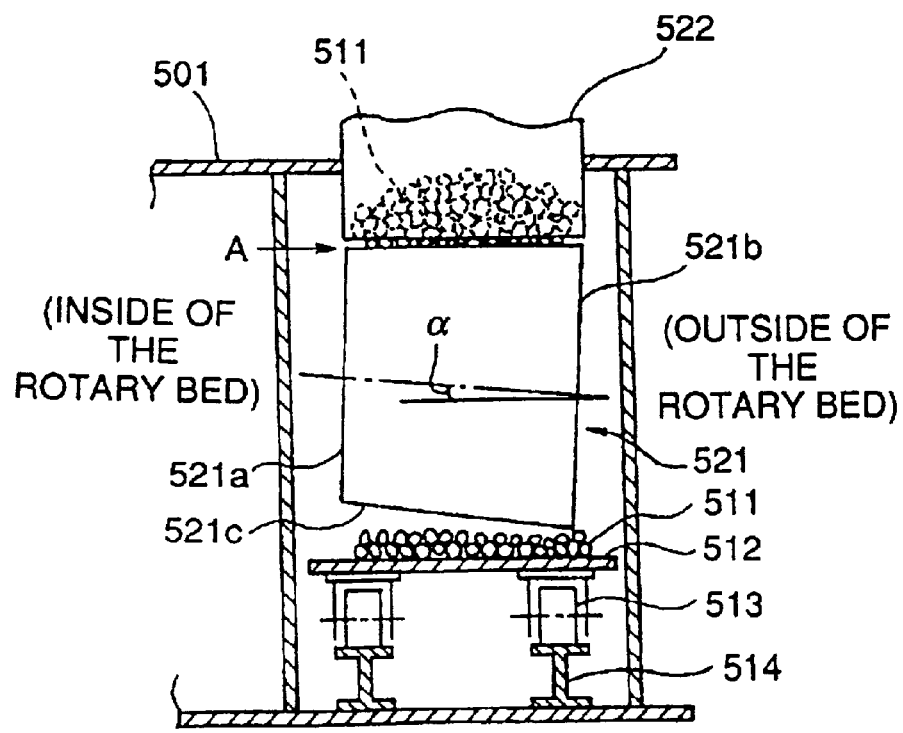
FIG. 14 is a side view of the pellet charging device viewed from side as shown by arrows marked by III and III.
Figure 12:
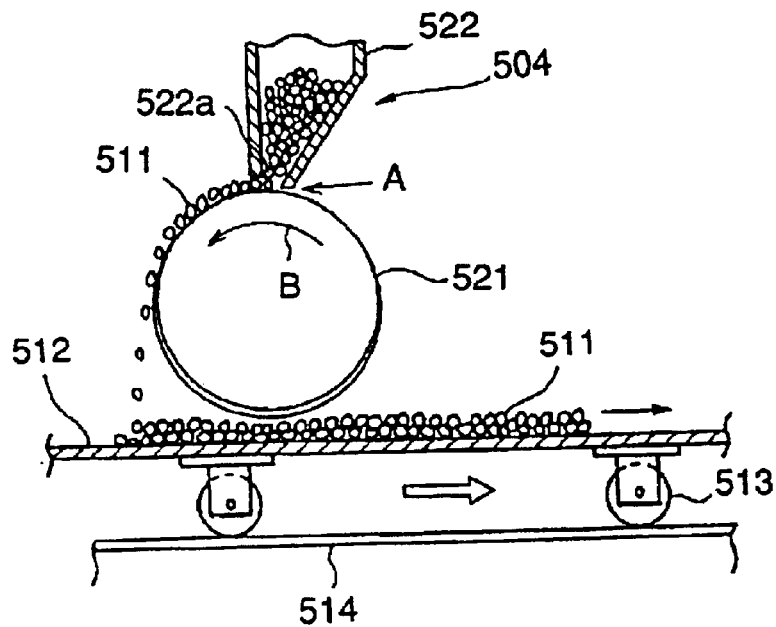
FIG. 12 is a diagram showing the pellet charging device according to the fifth embodiment of the present invention.
Figure 13:
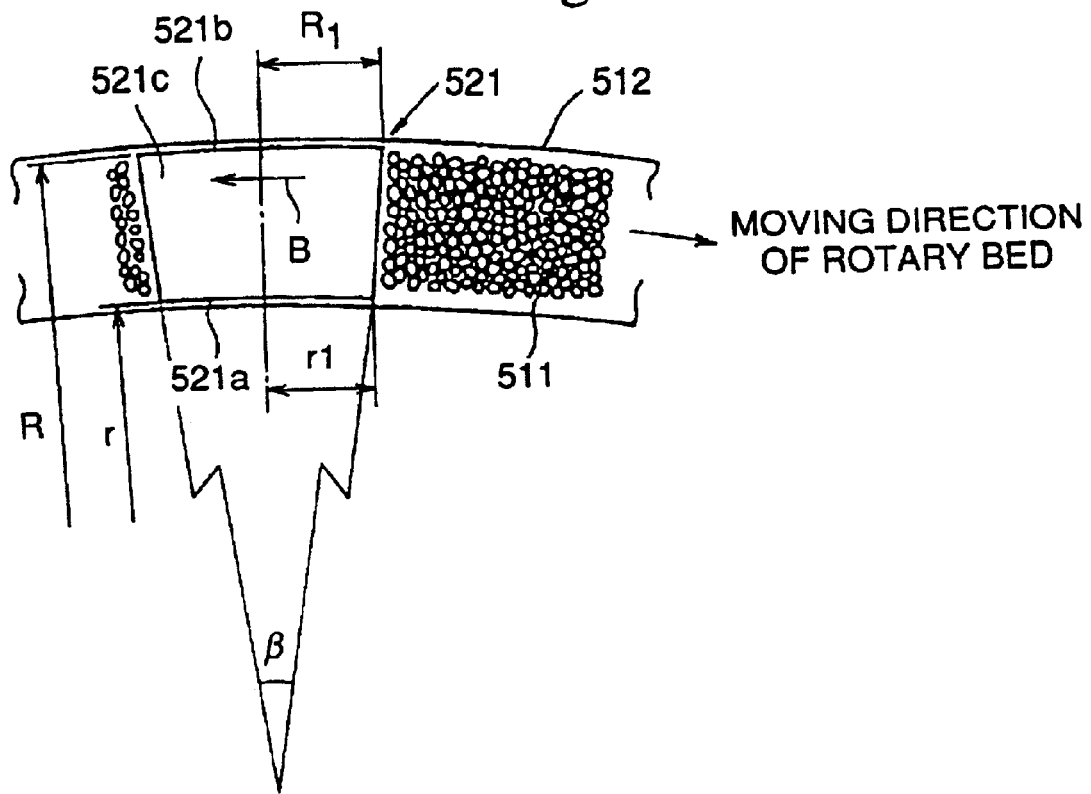
FIG. 13 is a diagram of the pellet charging device viewed from above as shown by arrows marked by II and II.
Figure 15:
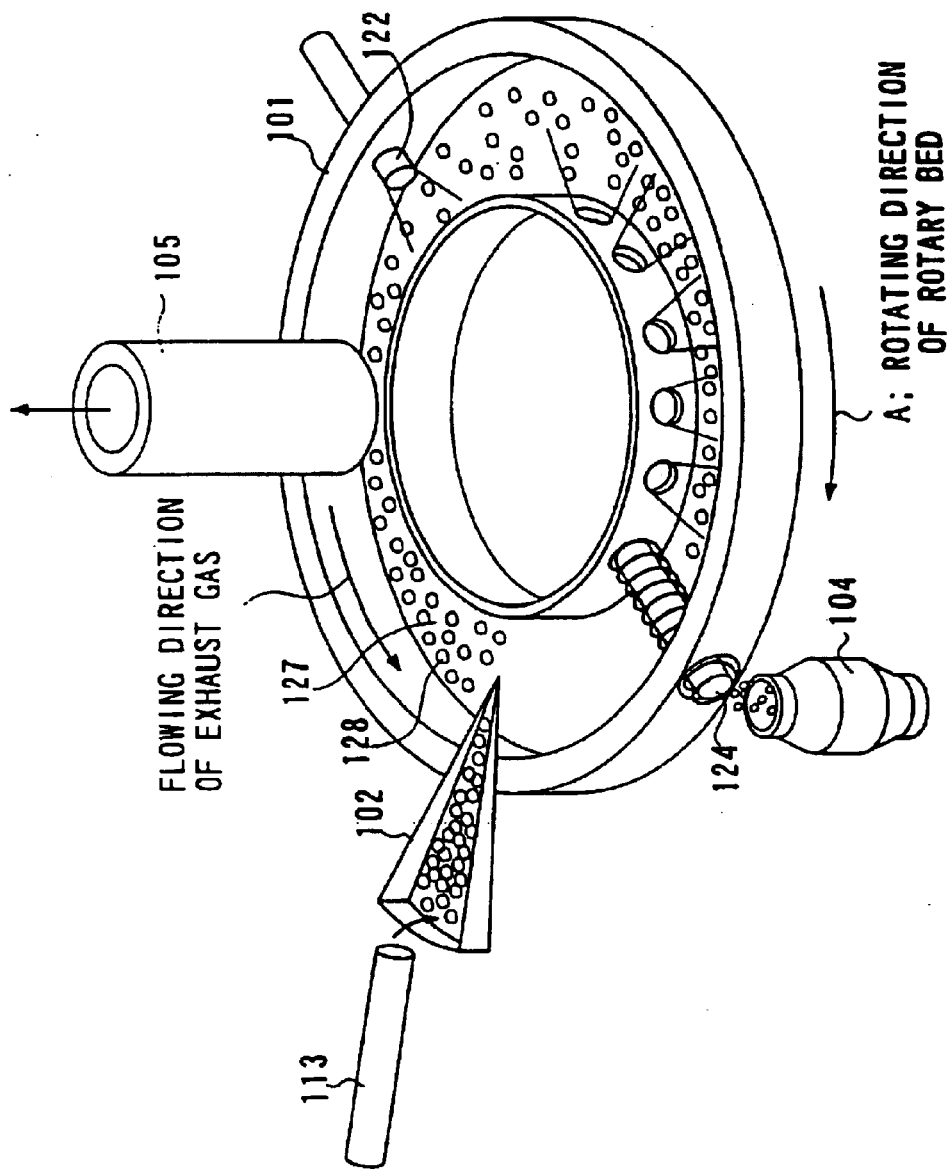
FIG. 15 is a schematic perspective view of a conventional rotary bed-type direct reducing furnace.
Figure 16:
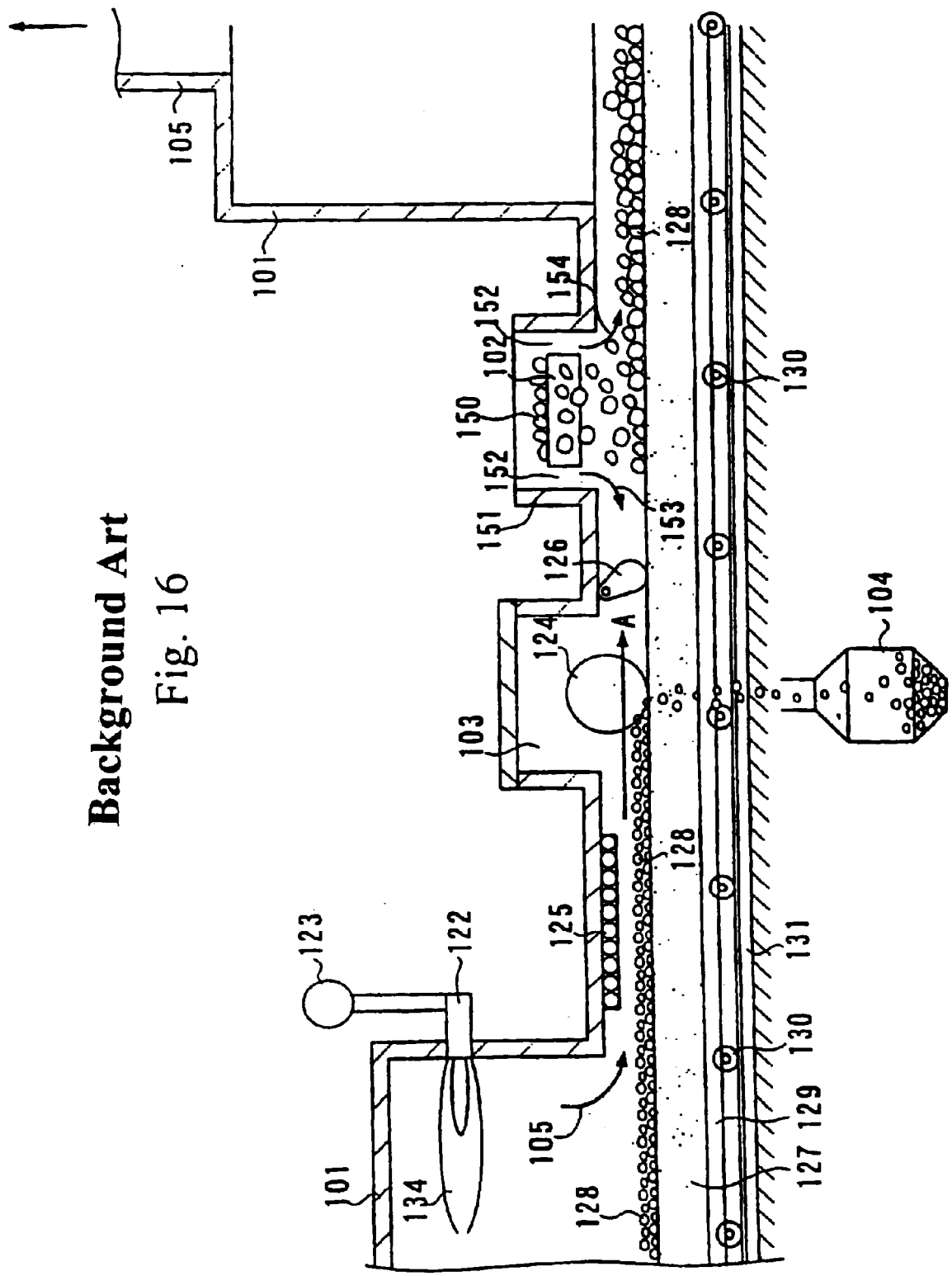
FIG. 16 is a partial cross-sectional and developed view along the central axis of the conventional rotary bed-type direct reducing furnace shown in FIG. 1.
Figure 17:
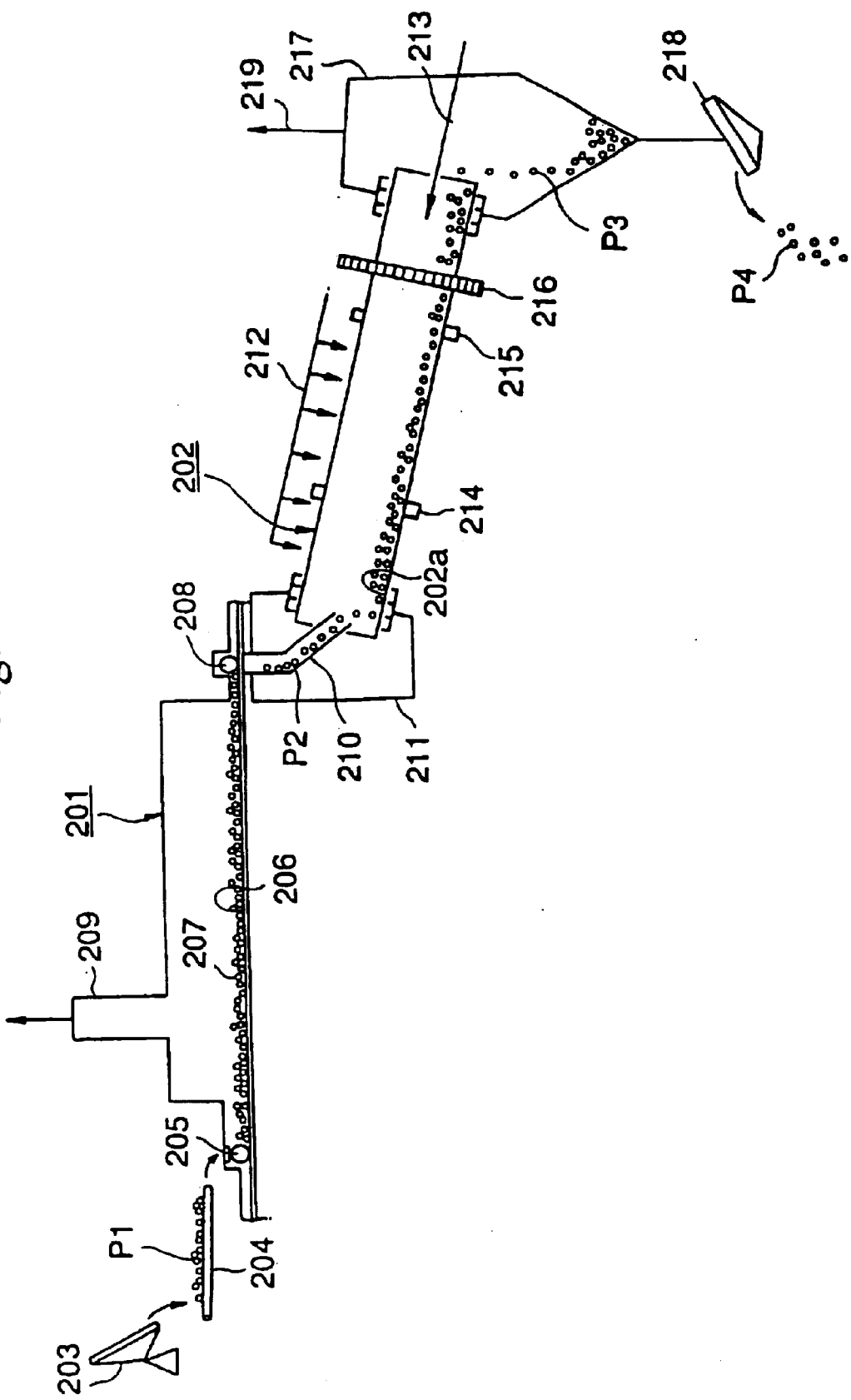
FIG. 17 is a schematic perspective view of a conventional rotary bed-type direct reducing furnace and a cooling cylinder.
Figure 18:
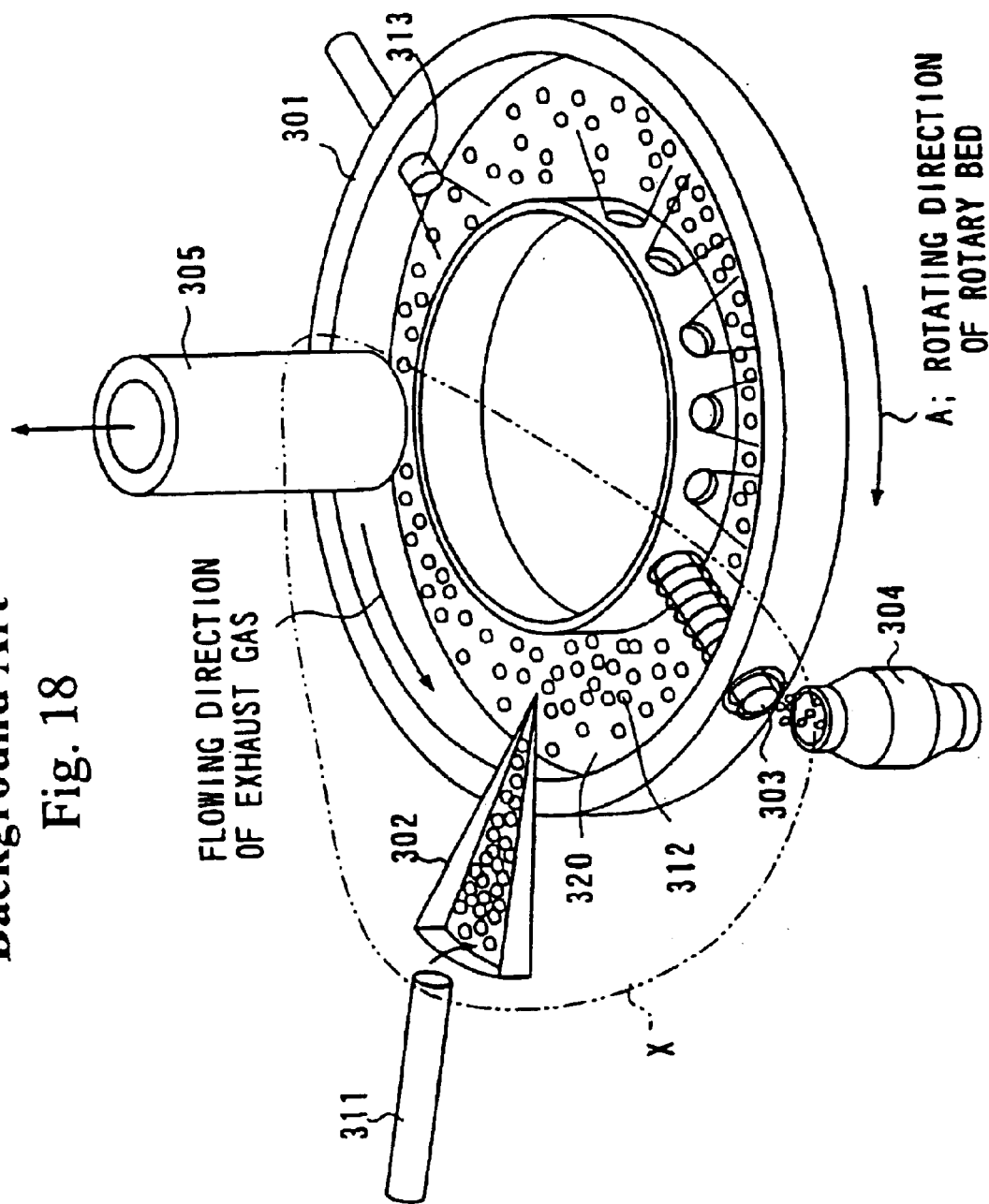
FIG. 18 is a diagram showing a top view of the conventional rotary bed-type direct reducing furnace.
Figure 19:
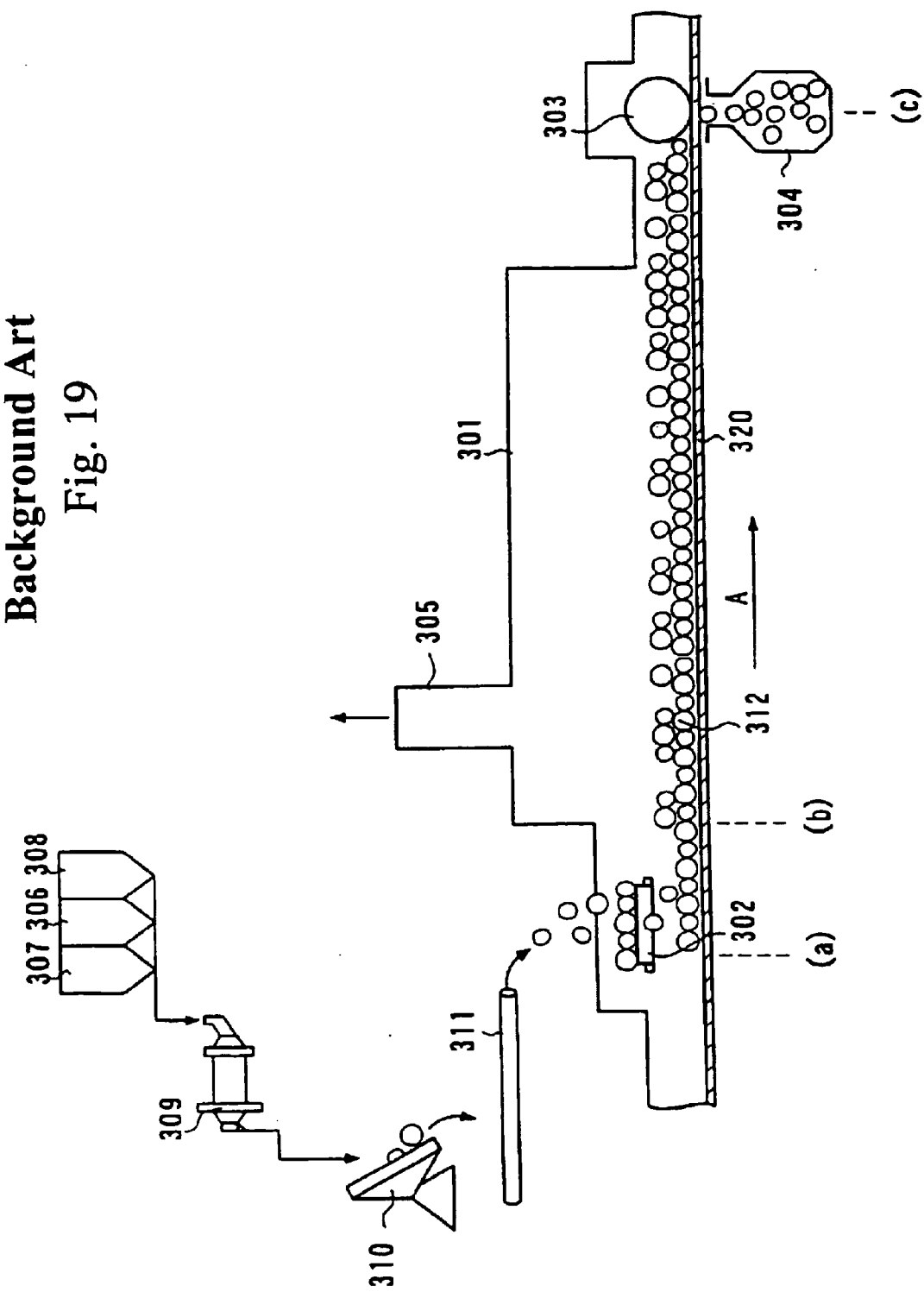
FIG. 19 is a schematic diagram showing the reduced iron pellets producing facility including the raw material processing facility and a conventional rotary bed-type direct reducing furnace shown as the cross-sectional and developed view.
Figure 20:
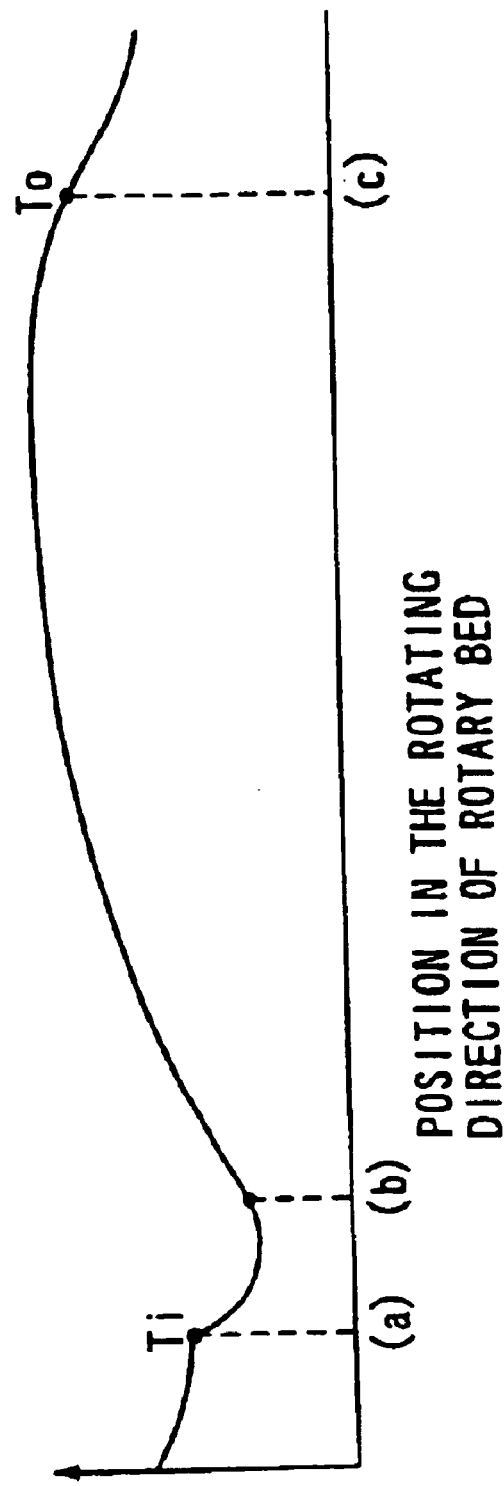
FIG. 20 is a diagram showing a relationship between the surface temperatures of the rotary bed of the conventional reducing furnace and the rotating directional positions of the rotary bed.

FIG. 12 is a diagram showing the pellet charging device according to the fifth embodiment of the present invention, FIG. 13 is a bird eye view from the directions of II and II shown by arrows, and FIG. 14 is a side view of the pellet charging device from the direction of III and III shown by arrows.

As shown in FIGS. 12, 13 and 14, the pellet charging device of the present embodiment 504 comprises a rotating drum 521 and a hopper 511 for supplying the raw material pellets 511 onto the rotating drum 521.

As shown in FIG. 14, the rotating drum is in a shape of a truncated cone, and a side surface of the truncated cone shaped rotating drum is disposed facing toward the rotary bed 512 such that the top surface 521a at the small diameter side of the truncated cone 521 is disposed facing toward the inner periphery of the rotary bed 512. The lower surface 512c of the rotating drum 512 faces to the rotary bed 512.

In this embodiment, the truncated surface of the rotating drum 521 is disposed parallel to the plane including the central axis of the rotary bed, and the rotating drum is disposed to have an angle of inclination (shown by a in FIG. 14) such that the side surface 512c of the rotating drum 521 becomes horizontal at the highest point of the rotating drum 521 (shown as A in FIG. 12) as shown in FIG. 14 to the bottom surface of the hopper 522. Thereby, the side upper surface of the rotating drum 521 becomes horizontal. In this embodiment, the rotating drum 521 is driven so as to be rotated in the direction shown by an arrow B in FIG. 12 by an electric motor (not shown) such that the tangential direction of the rotating drum becomes opposite to the moving direction of the rotary bed 512 (the direction of the rotary bed is shown by an arrow in FIG. 12).

Since the rotating drum 521 is in the shape of the truncated cone, the circumferential speed of the side surface of the rotating drum 521c varies depending on the rotating radius of the rotating drum. In the present embodiment, the vertical angle (the angle $\beta$ shown in FIG. 13) of the side surface of the rotating drum is determined such that the ratio of the circumferential speed at the large diameter of the rotating cone to that of the small diameter of the rotating cone coincides with the ratio of the rotational speed of the rotary bed just beneath the large diameter 521b of the rotating drum 521 and that of the rotary bed just beneath the small diameter 521a of the rotating drum 521. That is, when the radius of the vertical angle $\beta$ is r1, a radius of the bottom surface 21b is R1, the radius of the inner periphery of the rotary bed is r, and the radius of the outer periphery is R (see FIG. 13), the vertical angle of the rotating drum is set so as to satisfy an equation, $R1/r1=R/r$. Accordingly, the circumferential speed at each position of the upper side surface A of the rotating drum 521 coincides with the rotating speed at the each radial position of the rotary bed. For example, when the number of revolutions of the drum 521 is determined such that the circumferential speed of the bottom surface 521b of the drum 521 coincides with the rotating speed of the outer periphery of the rotary bed, the circumferential speeds at each position of the side surface of the drum 521 coincide with rotating speeds towards opposite direction of the rotary bed at each position just beneath each point of the drum 521.

The rotating drum 521 is disposed so as to leave a space corresponding to two or three layers of pellets. The hopper 522 is provided with an exit opening 522a, and the hopper 522 and the drum surface 521c are spaced so as to allow one layer of pellets to pass therethrough.

In the present embodiment, the raw material pellets 511 are placed in a hopper 522 and the pellets are delivered as a layer of pellets from an exit opening 522a on the rotating drum. The raw material pellets delivered from the hopper 522 slide over the side surface 521c of the drum 521, fall on the rotary bed 512, and are transferred below the rotating drum 521 by the movement of the rotary bed 512.

Assuming that a circumferential speed at a point on the side surface 521c of the rotating drum 521 is V, the moving speed of the rotary bed just beneath this point is also V. Therefore, the raw material pellets supplied on the rotary bed by one pellet layer move as one layer of pellets. In addition, in this embodiment, the central axis of the rotating drum is inclined such that the circumferential speed at each point of the rotating drum surface 521c becomes proportional to the moving speed of the rotary bed 512 at each point just beneath the point of the rotating drum surface 521c. Thus, the circumferential speed at a point on the rotating drum surface 521c coincides with the moving speed of the rotary bed.

Assuming that a circumferential speed at a point on the side surface 521c of the rotating drum 521 is V, the moving speed of the rotary bed just beneath this point is also V. Therefore, the raw material pellets supplied on the rotary bed by one pellet layer move as one layer of pellets. In addition, in this embodiment, the central axis of the rotating drum is inclined such that the circumferential speed at each point of the rotating drum surface 521c becomes proportional to the moving speed of the rotary bed 512 at each point just beneath the point of the rotating drum surface 521c. Thus, the circumferential speed at a point on the rotating drum surface 521c coincides with the moving speed of the rotary bed.

Consequently, since the circumferential speed of the rotating drum coincides with the moving speed of the rotary bed, the raw material pellets delivered from the hopper 522 are placed on the rotary bed as one pellet layer.

TABLE 1

| Example | Iron ore (wt %) | coal (wt%) | tar (wt %) | CMC (wt %) | PVA (wt %) | bentonite (wt %) | height without fracture |
|---|---|---|---|---|---|---|---|
| 2 | 75 | 20 | 5 | — | — | — | 400 mm |
| 3 | 79.8 | 20 | — | 0.2 | — | — | 500 mm |
| 4 | 79.8 | 20 | — | — | 0.2 | — | 500 mm |
| 5 | 65 | 15 | 20 | — | — | — | 1000 mm |
| 6 | 75 | 20 | — | 5 | — | — | 800 mm |
| 7 | 75 | 20 | — | — | 5 | — | 800 mm |
| 8 | 70 | 20 | 10 | — | — | — | 500 mm |
| 9 | 78 | 21 | — | 1 | — | — | 600 mm |
| 10 | 78 | 21 | — | — | 1 | — | 500 mm |
| 11 | 76 | 19.5 | 4 | — | — | 0.5 | 400 mm |
| 12 | 76 | 19.6 | 4 | — | — | 0.4 | 400 mm |
| 13 | 78 | 21.8 | — | 0.05 | 0.15 | — | 500 mm |
| 14 | 75 | 20.9 | 4 | 0.1 | — | — | 600 mm |
| 15 | 75 | 20.9 | 4 | — | 0.1 | — | 500 mm |
| 16 | 78 | 21.4 | — | 0.15 | 0.05 | 0.4 | 500 mm |
| 17 | 77 | 22.2 | — | 0.1 | 0.1 | 0.6 | 500 mm |
| 18 | 77 | 22.5 | — | 0.1 | 0.1 | 0.3 | 500 mm |

The case described above is that in which the circumferential speed of the drum coincides with the moving speed of the rotary bed. However, when the revolution frequency is set such that the circumferential speed of the rotating drum is an integer times as large as the moving speed of the rotary bed, it becomes possible to form a piled layer of pellets having any numbers of pellet layers. For example, if the circumferential speed of the rotating drum is set two times or three times as large as the moving speed of the rotary bed beneath the rotating drum, a layer in which two or three layers of pellet are piled may be formed uniformly on the rotary bed.

Since the raw material pellets do not incur any damage by being pressed by, for example, a dam, in this embodiment, an advantageous feature is further obtained that the raw material pellets may be prevented from suffering fracture or surface peeling.

According to the present embodiment, advantageous effects are obtained such that the present charging device allows charging the raw material pellets without incurring fracture, fracture, or surface peeling, and also allows charging the raw material pellets in a layer in which any numbers of pellets are piled. Thus, the reduced iron pellets obtaining by processing the thus charged raw material pellets has a uniform quality that is suitable and advantageous for subsequent processing.

What is claimed is:

1. A method of producing reduced iron pellets comprising:

pelletizing a mixture of iron oxide powder, a reducing material and a binder into raw material pellets;

reducing the raw material pellets in a rotary bed-type direct reducing furnace to obtain reduced iron pellets;

discharging the reduced iron pellets from the rotary bed-type direct reducing furnace at a temperature ranging between 1100 and 1200° C.;

transferring the reduced iron pellets to a heat retaining and rolling portion insulated by heat insulating material of a rotary cylinder; and sintering the reduced iron pellets by rolling in the heat retaining and rolling portion of the rotary cylinder at a temperature ranging between 800 to 1200° C.

2. A method of producing reduced iron pellets according to claim 1, wherein the reducing material comprises a carbonaceous material powder.

3. A method of producing reduced iron pellets according to claim 1, wherein the heat retaining rolling portion is positioned to receive the reduced iron pellets from a direct reducing furnace provided with a rotary flat floor for the reducing of the raw material pellets.

4. A method of producing reduced iron pellets according to claim 1, further comprising providing a cooling furnace where the reduced iron pellets are cooled and sprayed with water.

5. A method of producing reduced iron pellets according to claim 4, wherein the cooling furnace comprises a hopper.

* * * * *